(12) United States Patent
Nygren et al.

(10) Patent No.: US 11,920,320 B2
(45) Date of Patent: Mar. 5, 2024

(54) IMPLEMENT AND A METHOD FOR OBTAINING INFORMATION RELATED TO SAID IMPLEMENT

(71) Applicant: ÅLÖ AB, Umeå (SE)

(72) Inventors: Tomas Nygren, Umeå (SE); Gustaf Lagunoff, Umeå (SE)

(73) Assignee: ÅLÖ AB, Jmeå (SE)

( * ) Notice: Subject to any disclaimer, the term of this patent is extended or adjusted under 35 U.S.C. 154(b) by 846 days.

(21) Appl. No.: 16/379,606

(22) Filed: Apr. 9, 2019

(65) Prior Publication Data

US 2019/0234044 A1 Aug. 1, 2019

Related U.S. Application Data

(63) Continuation of application No. PCT/SE2017/050986, filed on Oct. 9, 2017.

(30) Foreign Application Priority Data

Oct. 10, 2016 (SE) .................................. 1651325-1

(51) Int. Cl.
| | |
|---|---|
| *B66C 13/16* | (2006.01) |
| *A01B 63/111* | (2006.01) |
| *B66C 1/40* | (2006.01) |
| *E02F 3/36* | (2006.01) |
| *E02F 3/43* | (2006.01) |

(Continued)

(52) U.S. Cl.
CPC ............ *E02F 3/432* (2013.01); *A01B 63/111* (2013.01); *E02F 3/3654* (2013.01); *E02F 3/627* (2013.01);
(Continued)

(58) Field of Classification Search
CPC ......... E02F 3/432; E02F 3/3654; E02F 3/627; E02F 9/2029; E02F 9/2235; E02F 9/26;
(Continued)

(56) References Cited

U.S. PATENT DOCUMENTS 4,055,255 A * 10/1977 Vasquez ................. G01G 13/20
414/21
4,230,196 A * 10/1980 Snead ...................... G01G 5/06
177/141

(Continued)

FOREIGN PATENT DOCUMENTS

| EP | 0860557 A1 | 8/1998 |
| EP | 0866177 A2 | 9/1998 |

(Continued)

OTHER PUBLICATIONS

International Search Report and Written Opinion for PCT/SE2017/050986, dated Dec. 15, 2017, 16 pages.

(Continued)

*Primary Examiner* — Edwin J Toledo-Duran
(74) *Attorney, Agent, or Firm* — Dinsmore & Shohl LLP

(57) ABSTRACT

An implement connectable to a work vehicle includes an arm, a fastening arrangement arranged at a first part of the arm, and an attaching arrangement. The fastening arrangement is connectable to the work vehicle an attaching arrangement is arranged at second part of the arm. The attaching arrangement is attachable to a tool. The implement further includes a second hydraulic circuit configured to carry hydraulic fluid to at least one second hydraulic function. The first hydraulic function comprises a lifting function and a local control element. The implement further includes at least one second sensor arranged to obtain sensor signals at least related to the lifting function, a local control element and a digital interface to the work vehicle. The control element is arranged to receive and process the received sensor signals so as to determine a load weight and to feed the determined load weight to the digital interface.

23 Claims, 9 Drawing Sheets

(51) Int. Cl.
*E02F 3/627* (2006.01)
*E02F 9/20* (2006.01)
*E02F 9/22* (2006.01)
*E02F 9/26* (2006.01)
*G01G 19/08* (2006.01)
*G01G 19/10* (2006.01)

(52) U.S. Cl.
CPC .......... *E02F 9/2029* (2013.01); *E02F 9/2235* (2013.01); *E02F 9/26* (2013.01); *E02F 9/264* (2013.01); *G01G 19/08* (2013.01); *G01G 19/10* (2013.01); *G05B 2219/45017* (2013.01)

(58) Field of Classification Search
CPC ....... E02F 9/264; E02F 9/2221; E02F 9/2228; A01B 63/111; G01G 19/08; G01G 19/10; G01G 19/00; G01G 19/14; G01G 19/083; G01G 23/3707; G01G 23/3728; G01G 5/00; G01G 19/52; G01G 23/163; G01G 21/23; G01G 23/42; G01G 23/36; G01G 9/00; G01G 11/04; G05B 2219/45017; G05B 19/4148; F15B 21/003; B66F 9/12; B66F 3/46; B66F 9/22; B66C 13/16; B66C 1/40
See application file for complete search history.

(56) References Cited

U.S. PATENT DOCUMENTS

| | | | | | |
|---|---|---|---|---|---|
| 4,390,075 | A | * | 6/1983 | Snead | G01G 3/147 177/1 |
| 4,632,630 | A | * | 12/1986 | Maki | B66F 9/12 414/718 |
| 4,919,222 | A | * | 4/1990 | Kyrtsos | E02F 9/264 177/25.14 |
| 5,119,894 | A | * | 6/1992 | Crawford | B65F 1/1484 177/139 |
| 5,209,313 | A | * | 5/1993 | Brodrick | G01G 3/1402 177/139 |
| 8,156,048 | B2 | * | 4/2012 | Mintah | E02F 9/2029 177/139 |
| 2003/0121409 | A1 | * | 7/2003 | Lunzman | F15B 13/0442 91/459 |
| 2006/0030989 | A1 | | 2/2006 | Alexander et al. | |
| 2009/0216412 | A1 | * | 8/2009 | Mindeman | E02F 9/26 701/50 |
| 2014/0167971 | A1 | | 6/2014 | Stanley et al. | |
| 2015/0129513 | A1 | * | 5/2015 | Gilmore, Jr. | B01D 35/143 210/85 |
| 2016/0258128 | A1 | | 9/2016 | Nakamura et al. | |

FOREIGN PATENT DOCUMENTS

| | | |
|---|---|---|
| EP | 1666997 A1 | 6/2006 |
| WO | 2009025772 A1 | 2/2009 |
| WO | 2013020856 A2 | 2/2013 |
| WO | 2015166210 A1 | 11/2015 |

OTHER PUBLICATIONS

Swedish Search Report for Patent Application No. 1651325-1, dated Jun. 2, 2017, 3 pages.

* cited by examiner

IMPLEMENT AND A METHOD FOR OBTAINING INFORMATION RELATED TO SAID IMPLEMENT

RELATED APPLICATIONS

The present application is a continuation of PCT Application No. PCT/SE2017/050986 filed Oct. 9, 2017, which claims priority to Swedish Application No. SE 1651325-1, filed Oct. 10, 2016, all of which are hereby incorporated in their entirety by reference as set forth herein.

TECHNICAL FIELD

The present disclosure relates to an implement connectable to a work vehicle, wherein said implement comprises an arm, a fastening arrangement arranged at a first part of the arm, said fastening arrangement being connectable to the work vehicle; an attaching arrangement connected to a second part of the arm, said attaching arrangement being attachable to a working tool; and a first hydraulic circuit configured to carry hydraulic fluid to at least one first hydraulic function.

The present disclosure further comprises a work vehicle arrangement comprising a work vehicle comprising a fastening arrangement connectable to the implement; and said implement.

The present disclosure further relates to a method for obtaining information related to an implement.

TECHNICAL BACKGROUND

Agricultural vehicles, such as tractors may be provided with a front loader. Operation of this front loader is controlled from the cabin of the tractor. For example an operator at the cabin of the tractor controls lifting and lowering of the loader and movement of a tool attached to the loader. The lifting and lowering of the loader may be performed by means of a first hydraulic circuit and movement of the attachment is characteristically performed by means of a hydraulic circuit controlled from the tractor.

WO 2013/020856 discloses an implement for attachment to a vehicle, wherein a first hydraulic circuit for control at the front loader is connectable to a control valve at the tractor. The control valve (and switch means) is controlled by a tractor control unit in the tractor to regulate fluid flow through the first hydraulic circuit.

U.S. Pat. No. 4,919,222 relates to a dynamic monitor arranged to measure and display payload weight for a loader vehicle by sensing the hydraulic pressure and position of the lift arm cylinders. The payload weight is computed by curve fitting the sensed cylinder pressure and position data to a second order polynomial, and then performing interpolation or extrapolation with a pair of pressure versus position reference parabolas obtained during calibration.

SUMMARY

One object of the present disclosure is to obtain an improved load weight determination for a load implement connectable to a work vehicle.

This has in different embodiments been achieved by means of an implement connectable to a work vehicle, said implement comprising an arm; a fastening arrangement arranged at a first part of the arm, said fastening arrangement being connectable to the work vehicle; an attaching arrangement arranged at a second part of the arm, said attaching arrangement being attachable to a tool; a second hydraulic circuit configured to carry hydraulic fluid to at least one second hydraulic function, wherein the second hydraulic function comprises a lifting function; at least one second sensor arranged to obtain sensor signals at least related to the lifting function; and a local control element. The implement comprises further a digital interface to the work vehicle. The control element is arranged to receive the obtained sensor signals at least related to the lifting function, to process the received sensor signals so as to determine a load weight and to feed the determined load weight to the digital interface. The digital interface (301; 701) is arranged to transfer the load weight to the work vehicle.

Thus, communication of data to and from the implement is performed digitally via the digital interface. This provides for a robust solution where no analogue signals have to be communicated between the implement and the work vehicle to which it is attached.

Further, the intelligence is related to the implement. The implement control element performs processing; it is no just a gatherer of data. As the intelligence for determining the load weight is arranged at the implement, the implement hardware and software forms a separate module which can be equipped to the work vehicle when it is desired to have an implement attached to the work vehicle which is capable of load weight determination. A work vehicle without an implement does not need to be prepared with components for use when attaching an implement.

The implement can be used at any work vehicle. As is clear from the above, no preparations are required at the work vehicle for installing the implement.

Further, the data handled by the local control element can be stored at the local control element. Program code for executing the different tasks of the local control element may also be stored at the implement. Further, the local control element can store data related to characteristics of the implement to which it is mounted. The local control element comprises then one or a plurality of memories for storing at least some of the data above.

Accordingly, all information related to obtained sensor signals can be obtained, processed and stored at the implement. Further, characteristics of the implement can be stored at the implement for example for use in the processing. Thus, as all data related to the implement can be stored at the implement. This has the consequence that if an implement is moved for example from one work vehicle to another work vehicle, all data associated therewith follows the implement. This enables accurate monitoring of the operation of the implement.

Thus, implements can be used together with and switched between a plurality of work vehicles while keeping track of each individual implement. Each individual implement has the ability to know its own characteristics, parameters and settings. The work vehicle to which an individual implement is attached on the other hand, does not know that, at least not without providing a separate logistic solution for obtaining this information. In fact, the work vehicle has normally no way of knowing which implement is attached, and the work vehicle does certainly not know the characteristics, parameters and settings of the implement presently attached.

Further, when the local control element of the implement determines the load weight and it is transferred to the work vehicle digitally via the digital interface, the risk of being exposed to disturbances is minimized as no analogue signals are transmitted to the work vehicle.

The second hydraulic circuit may be configured to carry hydraulic fluid from a second hydraulic connection connectable to the work vehicle.

In different embodiments, the implement comprises a lifting hydraulic cylinder arrangement for control of the lifting function. The second, lifting hydraulic cylinder arrangement may be connected to the second hydraulic connection.

In different embodiments the least one second sensor comprises a pressure sensor arranged to obtain a signal related to at least one hydraulic pressure related to the lifting cylinder arrangement and wherein the local control element is arranged to determine a load weight based on the obtained hydraulic pressure.

In different embodiments the at least one pressure sensor comprises sensors obtaining pressure signals at both sides of a lifting cylinder of the lifting cylinder arrangement and wherein the local control element is arranged to determine a load weight based on a pressure difference between the respective sides of the lifting cylinder.

When measuring the pressure at both sides of the lifting cylinder, a more accurate determination of the load weight can be achieved. This difference pressure defines the force exerted by the hydraulic cylinder. The effect of any back pressure or counter pressure is then accounted for. Thereby the accuracy of the determination can be increased.

In different embodiments the pressure sensors are mounted at a respective hydraulic line connected to the lifting cylinder arrangement.

This provides a flexible solution for positioning of the pressure sensors. The pressure sensors can be mounted anywhere along the lines from the second hydraulic connection. Accordingly, the pressure sensors can be mounted where they are best suited from a design perspective. For example, the pressure sensors can be mounted close to the second hydraulic connection.

In different embodiments the control element is arranged to record an obtained hydraulic pressure related to a lifting cylinder of the lifting cylinder arrangement during lift of the arm, wherein the control element is arranged to determine the load weight based on the recorded pressure.

Thereby a pressure curve is obtained during the lifting movement and the load weight is determined based on the obtained hydraulic pressures of the curve.

In different embodiments the at least one second sensor comprises a second position sensor arranged to obtain signals relating to the rotational position of the implement in relation to the work vehicle. The control element is arranged to record the obtained hydraulic pressure during a phase of lifting where the signals relating to the rotational position of the implement in relation to the work vehicle indicates that the arm is within predetermined boundaries for load weight determination.

Thereby it can be secured that hydraulic pressures are recorded within boundaries where the dynamics of the system are stable. In practice this means that the hydraulic pressures are not recorded close to the end points for the movement of the arm.

In different embodiments the local control element is arranged to obtain a failure status report and/or refrain from determining a load weight when records of the hydraulic pressures have not been obtained for the entire range delimited by the boundaries for load weight determination.

Thereby it can be secured that the records of the hydraulic pressures have been obtained for the entire range. Accordingly, the accuracy of the load weight determination can be secured with this respect. In the example wherein the local control element refrains from delivering a result when records have not been obtained for the entire range, and an accurate load weight determination may not be achieved, it can be ensured that no faulty weight results are delivered. Further, in the example wherein a failure status report is obtained, this report can comprise information related to the cause of the failure. Thus, the failure status report forms a guide for the operator to improve the behaviour in order to be able to achieve accurate load weight determinations.

In different embodiments the control element is arranged to determine a speed of the lifting movement during lift of the load, and to obtain failure status report and/or refrain from determining a load weight when the lifting speed is outside predetermined limit(s).

Thereby it can be secured that the arm has been moved with a speed suitable for an accurate determination of the load weight. Accordingly, the accuracy of the load weight determination can be secured with this respect. In the example wherein the local control element refrains from delivering a result when the speed of the movement is outside set boundaries, and an accurate load weight determination may not be achieved, it can be ensured that no faulty weight results are delivered. Further, in the example wherein a failure status report is obtained, this report can comprise information related to the cause of the failure. Thus, the failure status report forms a guide for the operator to improve the behaviour in order to be able to achieve accurate load weight determinations.

In different embodiments the implement comprises at least one first hydraulic function comprising a movement of the working tool in relation to the implement and at least one first sensor arranged to obtain sensor signals at least related to the movement of the working tool in relation to the implement. The control element is arranged to determine a rotational position, or rotational angle, of the tool during the lifting.

In different embodiments the control element is arranged to obtain failure status report and/or refrain from determining a load weight when the rotational position of the tool during lifting is outside predetermined limit(s).

Thereby it can be secured that the working tool has a suitable rotational position for accurate determination of the load weight. Accordingly, the accuracy of the load weight determination can be secured in this respect. In the example wherein the local control element refrains from delivering a result when the rotational position is outside set boundaries, and an accurate load weight determination may not be achieved, it can be ensured that no faulty weight results are delivered. Further, in the example wherein a failure status report is obtained, this report can comprise information related to the cause of the failure. Thus, the failure status report forms a guide for the operator to improve the behaviour in order to be able to achieve accurate load weight determinations.

In different embodiment the control element is arranged to obtain calibration information The local control element is then arranged to record an obtained first reference hydraulic pressure related to the lifting cylinder arrangement during lift with a first predetermined load, to save the first reference pressure curve related to said lift with a first predetermined load, to record an obtained second reference pressure related to the lifting cylinder arrangement during lift with a second predetermined load, and to save the second reference pressure curve related to said lift with the second predetermined load. The local control element is then arranged to determine the load weight based on the saved first reference pressure curve related to the lift with the first predetermined load and the saved second reference pressure curve related to the lift with the second predetermined load.

In different embodiments the control element is arranged to obtain a rotational position of the tool at the recorded pressure curve related to the lifting with the first predetermined load and/or the lifting with the second predetermined load.

These obtained rotational positions associated to the first and second reference pressures, respectively, can be used by the local control element to secure that the rotational positions of the tool during lifting of a weight are within the predetermined limit(s).

Thus, if lifting is performed with a rotational position deviating more than a pre-set value from the rotational positions used when obtaining the first and/or reference curves, the control element is arranged to obtain failure status report and/or refrain from determining a load weight.

In different embodiments the control element is arranged to feed information to the digital interface related to the rotational position of the tool at the recorded pressure curve related to the lift with the first predetermined load and the lift with the second predetermined load.

In this way the operator of the work vehicle can view the rotational positions used when making the calibrations and to adapt the behaviour accordingly to as much as possible imitate the situation when the calibration curves were taken.

Different embodiments of the disclosure relate to a work vehicle arrangement. The work vehicle arrangement comprises a work vehicle and an implement according to the above.

The work vehicle comprises in different embodiments means for attachment of such that the implement is rotatable in relation to the work vehicle in at least one direction.

In different embodiments, the work vehicle comprises at least one control valve controlled at least partly by the implement control element.

The work vehicle arrangement comprises in different embodiments further an operator interface connected to the digital interface.

The operator interface comprises in different embodiments a display arranged to display the load weight.

The operator control interface comprises in different embodiments a presentation element comprising a processor arranged to process the load weight and a display arranged to present the processed load weight.

The operator interface comprises in different embodiments a user input element such as a joystick.

The present disclosure further relates to a method for obtaining information related to an implement. The method is performed at said implement connectable to a work vehicle. The implement comprises at least one sensor, a digital interface for communication with the work vehicle and a local control element connected to said digital interface. The method comprising the steps of receiving at the local control element obtained sensor signals, determining at the local control element the information related to the obtained sensor signals and feeding the information related to the obtained sensor signals to the digital interface. The step of determining the information related to the obtained sensor signals comprises determining a load weight.

The method may further comprise a step of obtaining sensor signals related to the implement by means of the at least one sensor.

The present disclosure further relates to software for obtaining information related to an implement, said software being adapted to perform the method above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
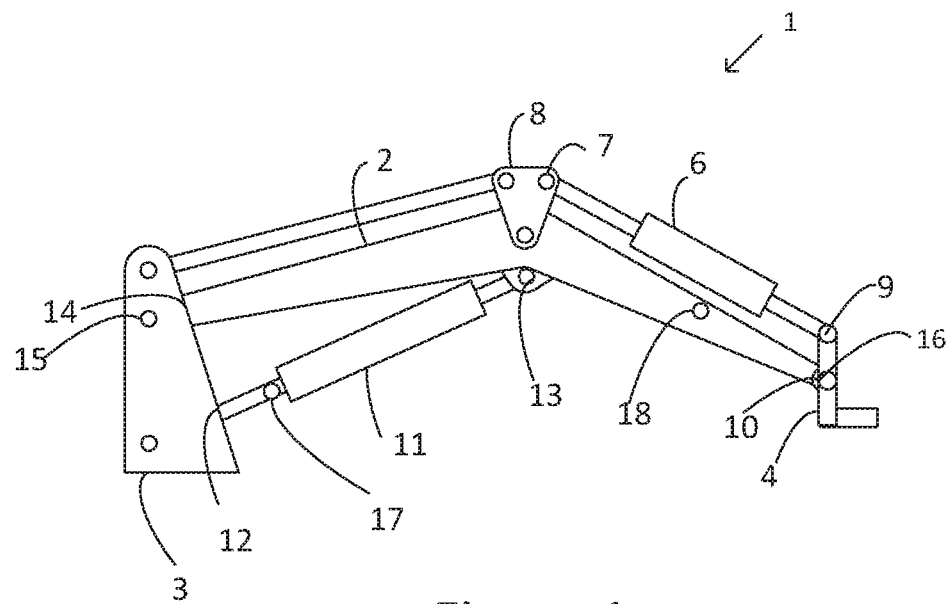
FIG. 1 illustrates an example of an implement attachable to a work vehicle.

In FIG. 1 an implement 1 connectable to a work vehicle is illustrated. The implement, or loader, forms an elongated working tool carrier. The implement may be a front loader.

In the illustrated example, the implement comprises an arm 2. A fastening arrangement 3 is arranged at a first part of the arm. The fastening arrangement is connectable to the work vehicle. The fastening arrangement is in one example attached in relation to the arm 2 such that the arm can be moved in relation to the work vehicle. For example, the fastening arrangement 3 may be pivotally arranged in relation to the work vehicle. Thereby the arm can be made to make a pivoting movement in relation to the work vehicle around the pivot axis of the fastening arrangement.

The implement further comprises an attaching arrangement 4 connected to a second part of the arm 2. The attaching arrangement 4 is attachable to a working tool 5. The attaching arrangement 4 is in one example attached in relation to the arm 2 such that the attachment arrangement possibly with the working tool can be moved in relation to the arm 2. For example, the attaching arrangement 4 may be pivotally arranged in relation to the arm. Thereby the attaching arrangement 4 can be mad to make a tilting movement in relation to the arm.

In the illustrated example, the arm 2 is an elongated arm. The arm is in the illustrated example rigid. The arm is on one example straight. The arm has in one example an elbow. The arm may comprise a plurality of elongated supporting arms connected to each other by transverse supports.

In the illustrated example, the implement comprises a first hydraulic cylinder arrangement 6. The first hydraulic cylinder arrangement 6 is when actuated arranged to cause the implement to carry out at least one first function. In the example, the at least one first function comprises a control of the attachment arrangement, and consequently a working tool attached thereto, in relation to the arm 2. Thus, movement of the attaching arrangement, and the working tool, when attached, can be controlled by the first hydraulic cylinder arrangement 6. The attachment arrangement 4 and the working tool 5 can be controlled to perform a tilting movement. In the illustrated example, the first hydraulic cylinder arrangement 6 is at its first end 7 attached to the arm. The first hydraulic cylinder arrangement 6 is for example mounted to the arm 2 at the middle of the arm. The first hydraulic cylinder arrangement 6 is in the illustrated example at its first end 7 mounted at an elbow of the arm. In the illustrated example, the first hydraulic cylinder arrangement 6 is at its first end 7 mounted to a support 8 mounted at the arm. In one example, the first cylinder arrangement 6 comprises a pair of first hydraulic cylinders. In one example the first cylinder arrangement comprises one first hydraulic cylinder. When the arm comprises a plurality of elongated supporting arms connected to each other by transverse supports, one or a plurality of first cylinders can be mounted to each of the supporting arms.

Further, in the illustrated example, the first hydraulic cylinder arrangement 6 is at its second end 9 attached to the attaching arrangement 4 for attachment to the working tool 5. In one example, the first hydraulic cylinder arrangement 6 extends in parallel with the arm 2. Thus there is a radial distance between a point of (pivoting) attachment 10 of the attachment arrangement to the arm 2 and the point of attachment 9 of the first hydraulic cylinder arrangement 6 to the attachment arrangement 4. Thereby the attachment arrangement 4, and working tool 5 when attached, performs a pivoting movement in relation to the arm 2 as the piston(s) of the hydraulic cylinder arrangement 6 is extracted/retracted. In one example, the point of attachment of the second end 9 of the first hydraulic cylinder arrangement is straight above the point of attachment 10 of the attachment arrangement 4 at the arm 2. In one example, the attachment is such that the attachment arrangement 4 can perform a rotating movement in relation to the arm 2.

In the illustrated example, the implement 1 comprises further a second hydraulic cylinder arrangement 11. The second hydraulic cylinder arrangement 11 is when actuated arranged to cause the implement 1 to carry out a second function. In the illustrated example, the at least one second function comprises movement of the arm 2 in relation to the work vehicle, when the implement 1 is attached to the work vehicle. The arm 2 may be moved in a generally vertical direction in relation to the work vehicle. Movement of the arm 2 can be controlled by said second hydraulic cylinder arrangement 11. The arm 2 can be controlled to perform a pivoting movement. In the illustrated example, the second hydraulic cylinder arrangement 11 is at its first end 12 attached to the fastening arrangement 3. Further, in the illustrated example, the second hydraulic cylinder arrangement 11 is at its second end 13 attached to the arm 2. The first end 12 is attached to the fastening arrangement 3 at a radial distance from an attachment point 14 of the arm. Thereby, the arm 2 of the implement is caused to perform a movement upon action/retraction of the piston(s) in the second hydraulic cylinder arrangement 11. In one example, the first end 12 is attached to the fastening arrangement 3 vertically in relation to the attachment 14 of the arm to the fastening arrangement 3. In accordance with this example, the arm 2 of the implement 1 is caused to perform a lifting/lowering movement upon extraction/retraction of the positon(s) of the second hydraulic cylinder arrangement 11. In one example, the second cylinder arrangement 11 comprises a pair of second hydraulic cylinders. In one example the second cylinder arrangement comprises one second hydraulic cylinder. When the arm comprises a plurality of elongated supporting arms connected to each other by transverse supports, one or a plurality of second cylinders can be mounted to each of the supporting arms.

The first and/or second hydraulic cylinder arrangements 6, 11 are connected to a respective hydraulic circuit on the work vehicle, when the implement is attached to the work vehicle. The respective hydraulic circuit carries fluid to the corresponding at least one cylinder based on control from a hydraulic control valve at the work vehicle.

Different working tools 5 can be attached to the implement, such as a bucket, a bale handler etc.

An example of a working tool attachable to the implement is a standard bucket for transporting bulk material. The first cylinder arrangement 6 may be arranged to pivot the bucket. The second hydraulic cylinder arrangement 11 may be arranged to raise and lower the arm and consequently the bucket attached thereto.

Further, one or a plurality of sensors 15, 16, 17 are arranged at the implement. In the illustrated example, one sensor 15 is arranged to obtain signals relating to the rotational position of the arm of the implement in relation to the working tool. In the illustrated example, one sensor 16 is arranged to obtain signals relating to the rotational position of the tool in relation to the implement. In one example, one or a plurality of sensors 17 is arranged to obtain signals related to a pressure in the second cylinder arrangement 11.

Further, the implement comprises a local control element 18. The local control element is in the illustrated mounted at the arm 2. However, it can be mounted anywhere at the implement 1.

Figure 2:
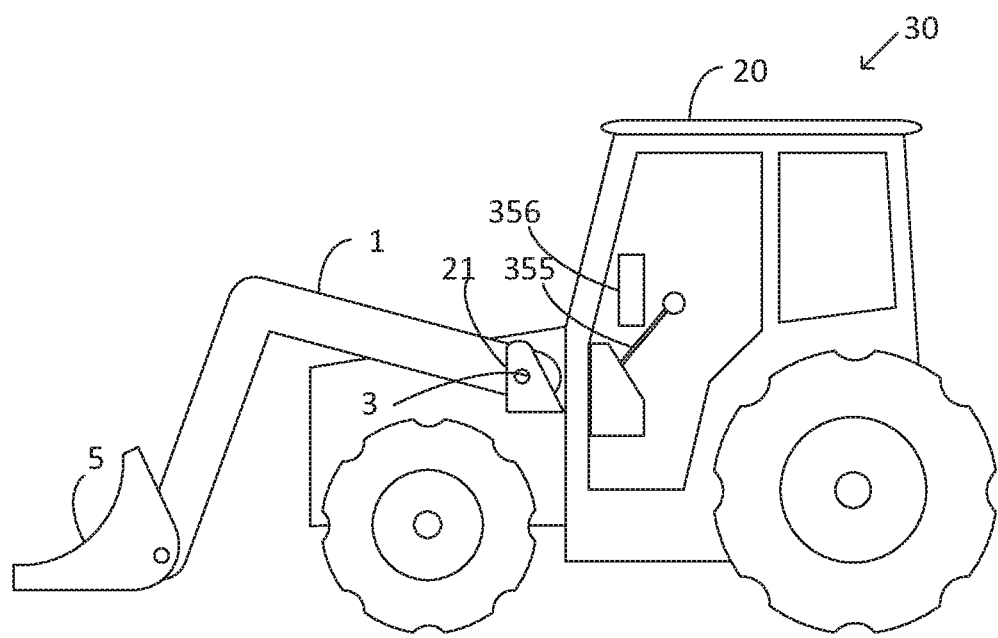
FIG. 2 illustrates an example of a work vehicle arrangement comprising a work vehicle and an implement attached thereto.

In FIG. 2, a work vehicle arrangement 30 is illustrated. The work vehicle arrangement 30 comprises a work vehicle 20 comprising a fastening arrangement 21 connectable to an implement 1, and said implement 1. The implement has a cooperating fastening arrangement 3 which fastens to the fastening arrangement 21 of the work vehicle. The implement 1 may be detachably fastened to the work vehicle. The implement may be fastened to the work vehicle such that the implement is rotatable around its points(s) of attachment in relation to the work vehicle in at least one direction.

The implement 1 may have the features as discussed in relation to FIG. 1. The work vehicle 20 is arranged to support hydraulics to the function of the implement when said implement is connected to the work vehicle and the hydraulic system is pressurized.

The implement is provided with at least one second sensor arranged to obtain sensor signals related to the at least one second hydraulic function of the implement. The implement is further provided with a digital interface to the work vehicle.

The implement has a local control element in communication with the digital interface. The local control element is arranged to receive the obtained sensor signals, to process the received sensor signals so as to determine the information related to the obtained sensor signals and to feed the determined information related to the obtained sensor signals to the digital interface. The determination of the information related to the obtained sensor signals comprises determining a load weight. The digital interface is arranged to transmit the received information related to the obtained sensor signals to the work vehicle.

The work vehicle may comprise an operator interface. The operator interface comprises in the illustrated example a display 356 arranged to present information related to the obtained sensor signals. The display may be a display with input means. The term "display with input means" is intended to include all both display with built-in input means and displays with input means connected thereto. Different examples of displays include displays with a touch screen or displays with or connected to a key board. The display may be a mobile device with a display such as a PDA (Personal Digital Assistant).

The display may be connected to the digital interface. The digital interface is then arranged to transfer the state parameter to the display.

The operator interface comprises in the illustrated example an operator input element 355 such as a joystick. The joystick may be provided with buttons and/or a scroll wheel, etc.

The work vehicle can be any type of work vehicle such an agricultural work vehicle such as a tractor.

In the illustrated example the work vehicle is a tractor. In the illustrated example the implement is a front loader.

The work vehicle further comprises a vehicle control element for control of vehicle functions. The vehicle control element is characteristically a distributed system of control nodes arranged to communicate with each other by means of a digital data bus. In one example, the vehicle control element is arranged to control supply of hydraulic fluid to hydraulic functions of the implement. In one example, the control of supply of hydraulic fluid to hydraulic functions of the implement is substantially performed by the local control element.

Figure 3:
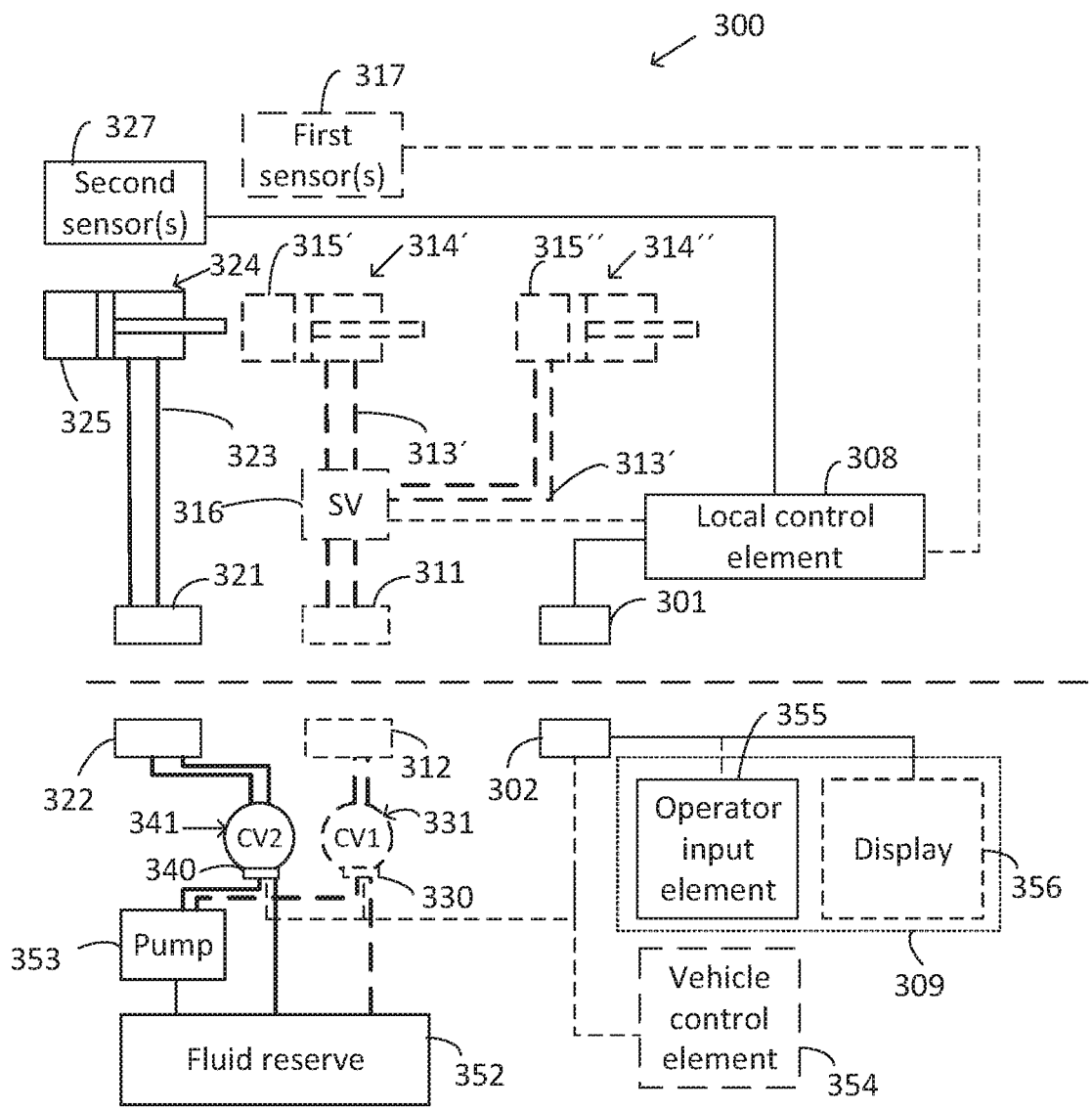
FIG. 3 illustrates a first hydraulic/electric circuit diagram for controlling an implement according to a first example.

In FIG. 3, an example of a hydraulic and electric circuit diagram 300 for obtaining information related to an implement connected to a work vehicle is illustrated. The example relates to a situation wherein a local control element at the implement controls supply of hydraulic fluid to one or a plurality of hydraulic functions of the implement. However, this is only intended as an example. The control of supply of hydraulic fluid to one or a plurality of hydraulic functions at the implement can likewise be performed at a work vehicle control element.

The diagram comprises parts located on the work vehicle and parts located on the implement. A dashed line horizontally dividing the Figure in two parts shows an example of which parts can be located on the work vehicle and which parts can be located on the implement.

In the illustrated example, the implement part comprises a second hydraulic connection 321 connectable to the work vehicle. The second implement hydraulic connection 321 is connectable to the work vehicle by means of a corresponding second vehicle hydraulic connection 322. A second hydraulic circuit 323 is when the second implement hydraulic connection 321 is connected to the corresponding second vehicle hydraulic connection 322 configured to carry hydraulic fluid via said first hydraulic connections 321, 322 to at least one second hydraulic function 324. In the illustrated example the at least one second function 324 is carried out by means of actuation of a second hydraulic cylinder arrangement 325. In FIG. 1, examples are given related to the mounting of the second cylinder arrangement 325. When there are more than one second function, a common second hydraulic cylinder can in one example adapted to carry out the second function. Alternatively, different cylinders can be used for carrying out the different second functions 324. Thus, the second hydraulic cylinder arrangement 325 is connected to the second implement hydraulic connection 321 for controlled supply of pressurized fluid to the second hydraulic function for control of the at least one second hydraulic function. The at least one second hydraulic function 324 may comprise a function for liftering/lowering of the implement.

The implement part may also comprise a first hydraulic connection 311 connectable to the work vehicle. The first implement hydraulic connection 311 is connectable to the work vehicle by means of a corresponding first vehicle hydraulic connection 312. First hydraulic circuits 313', 313" are when the first implement hydraulic connection 311 is connected to the corresponding first vehicle hydraulic connection 312 configured to carry hydraulic fluid via said first hydraulic connections 311, 312 to at least one first hydraulic function 314', 314". In the illustrated example the at least one first function 314', 314" is carried out by means of actuation of a first hydraulic cylinder arrangement 315', 315". In FIG. 1, examples are given related to the mounting of the first cylinder arrangement at the implement. When there is more than one first function, a common first hydraulic cylinder is in one example adapted to carry out the first functions (not illustrated). Alternatively, as is illustrated in FIG. 3, different cylinders 315', 315" are used for carrying out the different first hydraulic functions 314', 314". Thus, the respective cylinder of the first hydraulic cylinder arrangement 315', 315" is connected to the first implement hydraulic connection 311 for controlled supply of pressurized fluid to the associated first hydraulic function for control of the first hydraulic function.

The at least one first hydraulic function 314', 314" may comprise a function 314' for movement of the working tool in relation to the implement. The at least one first hydraulic function may further comprise a further function 314" such as a hydraulic working tool lock mounted in parallel with the function for movement of the working tool.

In the illustrated example, the first hydraulic circuit 313' is connectable to at least one further first hydraulic circuit 313" by means of switch means 316. The switch means comprises in one example a switch valve and/or selector valve.

In the illustrated example, at least one second sensor 327 may further be arranged on the implement. The at least one second sensor 327 is arranged to obtain sensor signals related to the second hydraulic function 324. The at least one second sensor 327 may comprise a sensor arranged to sense the rotational position of the implement in relation to the work vehicle. The at least one second sensor 327 may be arranged to sense a pivotal position of the implement in relation to the work vehicle. The at least one second sensor 327 may comprise a radial Hall sensor.

Alternatively, or in addition thereto, the at least one second sensor arranged to obtain signals related to the rotational position of the working tool in relation to the implement comprises a linear sensor. The rotational position can be calculated based on the signals obtained by the linear sensor.

Further, the at least one second sensor 327 may comprise at least one pressure sensor arranged to obtain signals related to a hydraulic pressure. The at least one a pressure sensor may be arranged to sense at least one pressure related to a pressure of the at least one cylinder of the second hydraulic cylinder arrangement. For example the at least one second pressure sensor comprises pressure sensors sensing the pressure of the respective chamber within the cylinder. As stated above in relation to the first pressure sensor(s), there is a substantially linear relation between the pressure and the load, at least when the rotational position of the arm in relation to the work vehicle is within certain ranges, and this relation can be used to determine the load.

Instead or in addition thereto, the at least one second pressure sensor comprises pressure sensors sensing the pressure in the two lines in the second hydraulic circuit. When two pressure sensors are used for obtaining signals related to a hydraulic pressure and those two pressure sensors are arranged to obtain signals related to the hydraulic pressure on both sides of the hydraulic cylinder, a difference pressure can be determined. This has as stated above in relation to the first pressure sensor(s) the effect that any back pressure or counter pressure can be accounted for.

At least one first sensor 317 may further be arranged on the implement. The at least one first sensor 317 is arranged to obtain sensor signals at least related to the at least one first hydraulic function 314', 314". The at least one first sensor 317 may comprise a sensor arranged to obtain signals related to the rotational position of the working tool in relation to the implement. The at least one first sensor may be arranged to sense a pivotal position of the working tool in relation to the implement. The at least one first sensor may comprise a radial Hall sensor. Alternatively, or in addition thereto, the at least one first sensor arranged to obtain signals related to the rotational position of the working tool in relation to the implement comprises a linear sensor. The rotational position can be calculated based on the signals obtained by the linear sensor.

Further, the at least one first sensor 317 may comprise at least one pressure sensor arranged to obtain signals related to a hydraulic pressure. The at least one a pressure sensor may be arranged to sense at least one pressure related to the first cylinder arrangement 315', 315". For example the at least one first pressure sensor comprises pressure sensors sensing the pressure of the respective chamber within at least one of the cylinders of the first hydraulic cylinder arrangement 314', 314". There is a relation between the hydraulic pressure, force exerted by the hydraulic cylinder. Further, there is a relation between the force exerted and a load at least partly carried by the cylinder. These relations can be used to obtain information related to the implement and/or a load carried by the working tool on the implement.

Instead or in addition thereto, the at least one first pressure sensor 317 comprises pressure sensors sensing the pressure in the two lines of at least one of the first hydraulic circuit(s) 313', 313". When two pressure sensors are used for obtaining signals related to a hydraulic pressure and those two pressure sensors are arranged to obtain signals related to the hydraulic pressure on both sides of the hydraulic cylinder, a difference pressure can be determined. This difference pressure defines the force exerted by the hydraulic cylinder. The effect of any back pressure or counter pressure is then accounted for.

The implement part of the system comprises further a local control element 308. The implement part of the system comprises further a digital interface part 301 connectable to the work vehicle. The implement digital interface part 301 is connectable to the work vehicle by means of a corresponding vehicle digital interface part 302. When the digital interface parts are connected, digital communication between the work vehicle and the local control element 308 of the implement is provided. The communication can be wired or wireless or a combination thereof.

The local control element 308 is arranged to receive the obtained sensor signals, to process the received sensor signals so as to determine the information related to the obtained sensor signals and to feed the determined information related to the obtained sensor signals to the digital interface. The determination of the information related to the obtained sensor signals comprises determining a load weight. The operation of the local control element is exemplified later in this disclosure.

The digital interface is arranged to transfer the determined information related to the obtained sensor signals to the work vehicle.

The local control element 308 may be arranged to receive an operator control signal via said digital interface for operator control of the at least one second function and possibly also the first function, if present. The local control element 308 may then be arranged to determine a control signal adapted to control at least one vehicle control valve 331, 341 at the work vehicle based on said operator control signal, and to transmit said control signal to the digital interface 301, 302. In the illustrated example, a first 331 of the vehicle control valves controls the first hydraulic circuits 313', 313". Further, a second 341 of the vehicle control valves controls the second hydraulic circuit 323. The vehicle control valves will be described more in detail below.

The local control element 308 may further be arranged to obtain a control signal adapted to control operation of at least one additional control valve 316 at the implement based on said operator control signal, and to feed said control signal to said at least one additional control valve. The operator control signal may comprise a selector signal. The least one additional control valve 316, 516', 516" may comprise a switch valve arranged to switch between opening/closing based on the selector signal, The least one additional control valve 316, 516', 516" may comprise a selector valve arranged to select hydraulic circuit based on the selector signal.

Thereby one of the first hydraulic circuits 313', 313" can be selected for supply of pressurized fluid. As is clear from the above, the additional control valve 316 is electrically connected to the local control element.

Further, the local control element may be supplied with a power supply such as by means of a 12V or 24V battery.

The signals provided from the local control element to the additional control valve(s) may due to the power supply have enough power to be able to drive the additional control valve(s). No individual power signal from the work vehicle is required for each additional control valve.

The local control element 308 may further be arranged to receive the obtained sensor signals and to determine the control signal adapted to control at least the at least one control valve 331, 341, and possible additional control valve(s), based on the obtained sensor signals. Thus, the local control element is arranged to receive the obtained first and/or second sensor signals and to determine the control signal adapted to control at least the at least one control valve, and possible additional control valve(s) based on the obtained first and/or second sensor signals.

The local control element 308 comprises in one example a control module, wherein the desired output, i.e. the behaviour of the first at least one and possible second hydraulic function is based on operator input to the control module. The input to the control module may be an operator signal. Thus, the control module is then controlled by direct operator control. The direct operator control may for example be provided by means of a joystick. Alternatively, the control module is controlled by means of indirect operator control. In indirect operator control, then local control element 308 may be arranged to generate signals according to a task planning scheme for example based on operator input by means of the operator interface such as said joystick or a display with input means. The control module may comprise a feedback loop that allows for feedback and self-correction. The operation is adjusted according to differences between the actual output as measured by the sensors and the desired output value.

Other known functions for control can be used. For example, the feed-back loop can be substituted or complemented with feed forward or model based control or open loop control.

In the illustrated example, the work vehicle part of the implement comprises a pump 353 and a fluid reservoir 352.

Further, the first vehicle control valve 331 may be connected to the pump 353 and fluid reserve 352. The first vehicle control valve 331 is configured to control hydraulic fluid for the at least one first hydraulic function 314', 314". When the first implement hydraulic connection 311 is connected to the first vehicle hydraulic connection 312, hydraulic fluid is carried to the at least one first hydraulic function 314', 314" based on control from the first control valve 331. Operation of the first control valve 331 is controlled from the local control element 308 by signals received over the digital interface 301, 302.

The second vehicle control valve 341 is connected to the pump 353 and fluid reserve 352. The second vehicle control valve 341 may be configured to control hydraulic fluid for the at least one second hydraulic function 324. When the second implement hydraulic connection 321 is connected to the second vehicle hydraulic connection 322, hydraulic fluid can be carried to the at least one second hydraulic function 324 based on control from the second control valve 341. Operation of the second control valve 341 is controlled from the local control element 308 by operator control signals received over the digital interface 301, 302.

Figure 10:
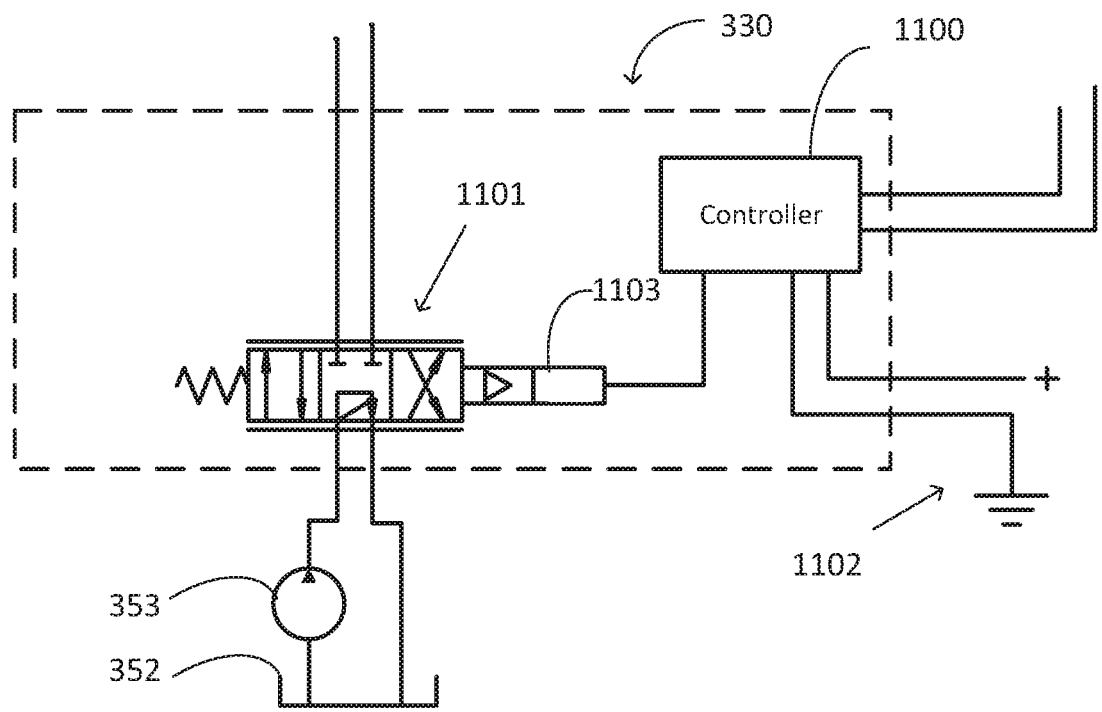
FIG. 10 is a scheme schematically illustrating an example of a regulator of or connected to a control valve according to one example.

In the illustrated example, the respective vehicle control valve 331, 341 comprises a regulator 330, 340 arranged to receive the signals received over interface and to control the action of the vehicle control valve based on the received signals. The regulator is arranged to control a direction of flow of the hydraulic fluid within the hydraulic circuit and the flow rate (m$^3$/s) of the hydraulic fluid based on the received signals. An example of a regulator is shown in FIG. 10.

In one example, the vehicle control valves 331, 341 are general purpose control valves adapted to support the hydraulic functions of the work vehicle. In accordance one or more additional hydraulic consumers (not shown) are connected to a hydraulic circuit fed by the hydraulic fluid by means of said general purpose vehicle control valves. When the implement is installed at a work vehicle with pre-installed or general purpose vehicle control valves, a gateway can be provided for directing the control signals from the local control element to the vehicle control valve(s). This may involve that the gateway is arranged to override functions in the work vehicle for controlling the first and possible second hydraulic functions.

In the illustrated example the gateway is implemented at a vehicle control element 354. The vehicle control element 354 is characteristically a distributed system of control nodes arranged to communicate with each other by means of a digital data bus.

The local control element may be connected to the gateway, or vehicle control element either via the digital interface or via a separate analogue or digital communication line (not shown) between the local control element and gateway, or vehicle control element 354.

Alternatively the vehicle control valves are control valves dedicated for control of hydraulic functions of the implement or working tool(s) attached thereto. In accordance with this example, the work vehicle can be clean from devices for control of implement, when the work vehicle is not provided with an implement. When an implement is to be attached to the work vehicle, the dedicated control valves are mounted to the pump and reserve of the work vehicle and the implement is mounted to the work vehicle.

In the illustrated example, the control valves are mounted at the vehicle part of the arrangement. However, the hydraulic connection(s) 311, 312, 321,322 may instead be arranged between the control valve(s) 331, 341 at one hand, and the pump 353 and hydraulic reserve 352 at the other hand. The control valve(s) may then be arranged at the implement.

The vehicle control valves for control of the implement can in accordance with these examples with dedicated control valves be adapted for control of the implement functions. No adaptations to other possible hydraulic consumers (having other requirements) are necessary. Further, the function of the local control element for control of the vehicle control valves is adapted to the implement on which it is mounted. Further, the function of the local control element for control of the vehicle control valves may also be adapted to the characteristics of the vehicle control valve(s) it is adapted to control The control signals for control of the first and possible second control valves 331, 341 may as stated above be received over the digital interface 301, 302. Alternatively the control signal is transmitted to the control valve over a separate line. These examples would characteristically involve that the signal is transmitted to the control valve via the gateway. The vehicle part of the system comprises a channel from communication of the control signals from the digital interface or gateway to the first and possible second control valve 331, 341. The channel is a digital channel. The digital channel is in one example a wireless channel. The digital channel is in one example a wired channel. The communication of signals may be performed by way of a digital data bus. Said digital data bus connects characteristically a plurality of nodes within the work vehicle. The communication over the digital channel, or data bus, is performed in accordance with a communication protocol. For example the communication may be over CAN.

The work vehicle part comprises further an operator interface 309 for operator monitoring and/or control of the implement. The operator interface 309 is arranged to communicate with the digital interface. The vehicle part of the system comprises a channel for communication of the operator control signals to the digital interface. The channel is in one example a digital channel. The digital channel is in one example a wireless channel. The digital channel is in one example a wired channel. The signals may be communicated, as stated above, by way of a digital data bus. Said digital data bus connects as stated above characteristically a plurality of nodes within the work vehicle. The communication over the digital channel, or data bus, is performed in accordance with a communication protocol. For example the communication may be over CAN.

The operator interface may be a general purpose operator interface. Thus, the general purpose operator interface may be adapted for user control of other functions than the functions as disclosed herein. Further, the general purpose operator interface may be adapted for monitoring and display of other functions than those disclosed herein. In accordance with these embodiments, when the implement is installed at a work vehicle, where pre-installed or general purpose vehicle operator interface(s) are to be used, the gateway can be provided for directing the operator control signals from the operator interface intended for the local control element to said local control element via the digital interface. This may involve that the gateway is arranged to override transfer of the operator control signals to other functions of the work vehicle. Further, the gateway can be provided for directing signals from the local control element to the operator interface. This may involve that the gateway is arranged to override transfer of signals from other functions of the work vehicle to the operator interface.

In the illustrated example the gateway is as stated above implemented at a vehicle control element 354, which characteristically is a distributed system of control nodes arranged to communicate with each other by means of a digital data bus.

In one example, the digital interface comprises a contactless interface device or probe to probe or recover information from a digital data bus for example of a CAN network of the work vehicle. The contactless probe is arranged to monitor the traffic on the work vehicle CAN network and to recover signals or messages having predetermined characteristics. The contactless probe may be arranged to recover signals exchanged on the work vehicle data bus comprising at least the operator control signal.

In this way, the implement becomes even more flexible to be mounted to virtually any work vehicle. Implements with advanced control functionality can be mounted to any work vehicle having a digital data bus, such as a CAN network. This contactless interface is suitable for aftermarket installation without any effect on the integrity of the work vehicle. For example, this contactless interface is particularly well suited for attachment to pre-owned work vehicles.

As work vehicles such as agricultural tractors today are commonly equipped with distributed electronic control systems, using CAN bus technology to link the different Electronic Control Units of the subsystems together, there is in order to manage the control of the work vehicle, a multitude of different information broadcasted on the CAN network, e.g. sensor data, user input from joysticks and switches, and different data regarding operation of the work vehicles.

Most implements traded are not delivered from factory together with the work vehicle. A more common situation is that the implement for a work vehicle is attached to the work vehicle as a dealer install option. Similarly as with the work vehicles, the control of implements are becoming more advanced, in order to increase the work efficiency and to the convenience for the drivers. This puts increased demand on the information required to control the implements. The use of the contactless interface allows for accessing different sort of information available in the work vehicle data bus. The accessed information can be used to control the implement and/or to provide more powerful functions.

Apart from accessing information related to signals from the local control element intended for the operator interface and possibly operator control signals intended for the local control element there is a long list of examples where access of information allows for integration of new functions. The implement functions requiring data from the work vehicle network may include (but not be limited to):

Status of hitch to make sure that implement is not active while operating front or rear hitch.

Status of seat switch for safety purposes, i.e. to make sure that the operator is seated while operating the implement Information on time to next work vehicle service to suggest implement service actions Information of ground speed or velocity for safety functions at high speed The contactless probe comprises a processor connected to a power supply such as a battery. The contactless probe comprises further one or two or more connection clips. When using two connection clips, the first connection may be installed on the line of rising pulse signals. The second connection may be installed on the line of descending pulse signals. The connections are made by clips without contact thus without wire connection, intended to recover the signals exchanged on the digital data bus. The clips may be arranged to ensure coupling of the capacitive type.

As discussed above, the operator interface may be or comprise general purpose operator interface parts. Alternatively, the operator interface is an operator interface dedicated for the tasks disclosed herein or comprising dedicated operator interface parts.

The operator interface comprises an operator input element such as a joystick 355. The joystick may be provided with buttons and/or a scroll wheel, etc.

The operator interface comprises in the illustrated example a display 356. The display may be a display with input means. The term "display with input means" is intended to include all both display with built-in input means and displays with input means connected thereto. Different examples of displays include displays with a touch screen or displays with or connected to a key board. The display may be a mobile device with a display such as a PDA (Personal Digital Assistant). The display 356 may be arranged to display information related to the state parameter based on information obtained by the local control element 308 and communicated over the communication channel between the digital interface and operator interface.

The operator input element and the display may be arranged to communicate with each other. A communication channel may be a digital channel. The digital channel is in one example a wireless channel. The digital channel is in one example a wired channel. The communication over the digital channel is performed in accordance with a communication protocol. For example the communication may be by way of CAN.

The vehicle control element 354 is adapted for control of vehicle functions.

In FIG. 10 a vehicle control valve comprises a regulator 330. The regulator 330 is arranged to receive control signals received from a local control element and to control the action of the vehicle control valve based on the received control signals. The regulator 330 is arranged to control a direction of flow of the hydraulic fluid within the hydraulic circuit(s) and the flow rate (m³/s) of the hydraulic fluid based on the received control signals.

In the illustrated example, a controller 1100 of the regulator 330 is arranged to receive the control signals from the local control element either via the digital interface or as an analogue signal. The controller 1100 is arranged to control the flow rate and a flow direction based on the received control signals. The controller 1100 is powered by a power source 1102 and outputs higher power control signals to an actuator 1103 based on the low power input control signals. The actuator in turn controls a proportional valve 1101. The proportional valve is in the illustrated example a bi-directional proportional control valve.

The actuator is for example an electrical motor or a solenoid. The solenoid can be directly connected to the proportional valve. Alternatively, the solenoid is indirectly connected to the proportional valve via a hydraulic circuit. Hence, the proportional valve may be an electrohydraulic valve or a direct operated valve. The proportional valve is in the illustrated example an open center valve. However, it may instead be a closed center valve. The proportional valve is connected to a pump 353 and fluid reserve 352.

The control signals received by the regulator 1100 may be determined by the local control element or by a work vehicle control element. This will be discussed more in detail in relation to FIG. 11.

Figure 4:
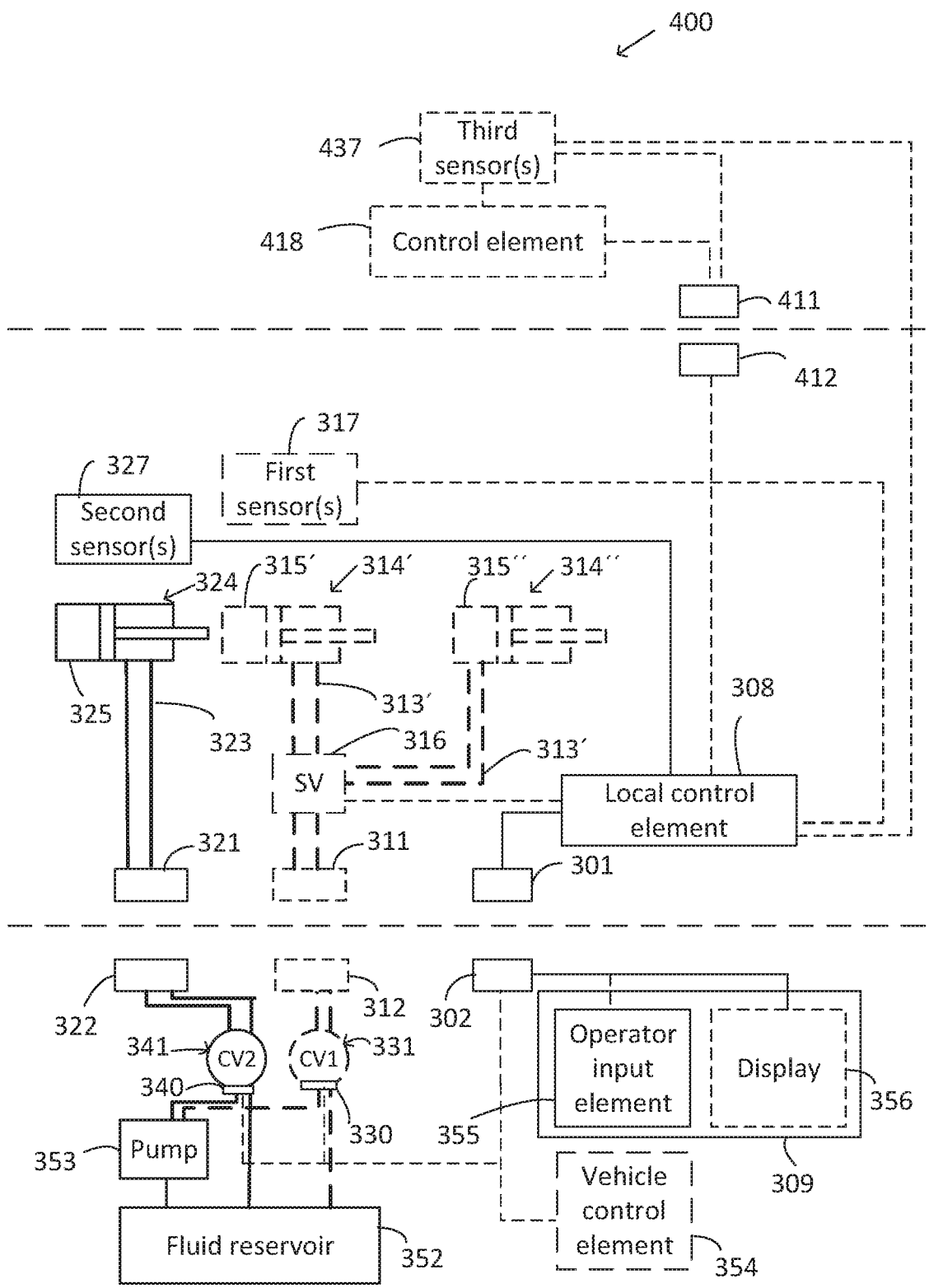
FIG. 4 illustrates a second hydraulic/electric circuit diagram for controlling an implement according to a second example.

In FIG. 4, a hydraulic and electric circuit diagram 400 for obtaining information related to an implement and a tool attached thereto is illustrated, wherein the hydraulic and electric circuits are arranged to control operation of the implement and possibly a tool attached thereto.

As in relation to FIG. 3, the examples relate to a situation wherein a local control element at the implement controls supply of hydraulic fluid to one or a plurality of hydraulic functions of the implement. However, this is only intended as an example. The control of supply of hydraulic fluid to one or a plurality of hydraulic functions at the implement can likewise be performed at a work vehicle control element.

The hydraulic and electric diagram of FIG. 4 corresponds to that of FIG. 3 with the addition that the implement further comprises a digital working tool interface 411, 412 for communication with at least one working tool sensor 437 and/or a local working tool control element 418 at a working tool, when the digital working tool interface 411, 412 is connected to the local control element. The digital working tool interface 411, 412 may be arranged to communicate wirelessly with the at least one working tool sensor 437 and/or a local working tool control element 418 at the working tool. The digital working tool interface 411, 412 may be arranged to communicate with the at least one working tool sensor 437 and/or a local working tool control element 418 by way of a digital channel. As stated above, the digital channel can be a wireless channel or a wired channel. The communication over the digital channel is performed in accordance with a communication protocol. For example the communication may be over CAN.

Alternatively, the at least one working tool sensor 437 may be analogously connected to the local control element of the implement.

In different embodiments (not shown), the implement is configured to carry hydraulic fluid to at least one third hydraulic function at the working tool. The implement may be arranged to carry hydraulic fluid for example from a third hydraulic connection to the at least one third hydraulic function at the working tool. In one example the local working tool control element 418 is arranged to control said third hydraulic function. Accordingly, the local working tool control element 418 is arranged to form a valve control signal based on an operator control signal received via the digital working tool interface, and to transmit said valve control signal to the digital interface 411, 412 for further communication to the control valve at the work vehicle which controls the at least one third hydraulic function.

In different embodiments, the local working tool control element 418 is arranged to receive sensor signals from the at least one working tool sensor 437. In one example, the local working tool control element 418 is arranged to transmit the received sensor signal to the working tool digital interface 411, 412. Alternatively, the local working tool control element 418 is arranged to calculate a state parameter related to the working tool based on the received sensor signals and to feed the calculated state parameter to the working tool digital interface 411, 412.

In the illustrated example, the digital interface between the implement and the working tool is described as an implement digital interface part 412 and a working tool digital interface part 411 connectable to the implement part 412. When the digital interface parts are connected, digital communication between the local working tool control element 418 and/or the working tool sensors 437, and the local control element 308 is provided.

Figure 7:
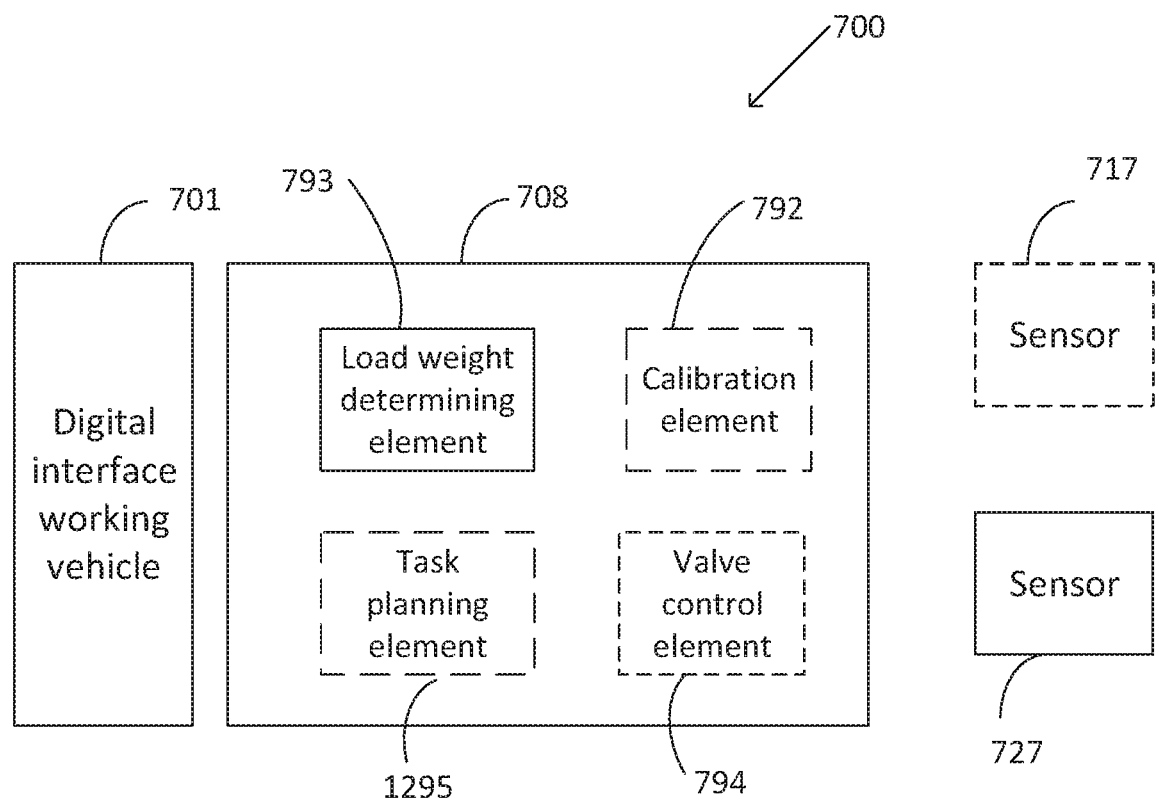
FIG. 7 is a block scheme schematically illustrating examples of functions of a local control element.

In FIG. 7 an example of an implement system 700 is illustrated. The implement system 700 comprises local control element 708 and a digital interface 701 to a work vehicle. The implement system also comprises one or a plurality of sensors 717, 727. The one or plurality of sensors is arranged to obtain sensor signals related to at least one hydraulic function of the implement. The local control element is arranged to receive sensor signals obtained by the at least one sensor 717, 727. The local control element is at least arranged for load weight calculation. The local control element may further have calibration functionality. The local control element may further comprise task planning functionality. The local control element may further comprise valve control functionality.

Thus, the control element 708 may be arranged to, among other things, calculate the weight of a load carried by a working tool attached to the implement and to feed the calculated load weight to the digital interface 701. The digital interface 701 is arranged to feed the calculated load weight to the work vehicle, for example to an operator control interface of the work vehicle.

The local control element comprises a load determining element 793. The load determining element 793 is arranged to receive obtained sensor signals, to process the received sensor signals so as to determine the load weight and to feed the determined load weight to the digital interface.

In one example, the load determining element 793 is arranged to receive obtained sensor signals related to at least one hydraulic pressure related to a lifting cylinder arrangement. Different ways of obtaining hydraulic pressures are for example disclosed herein.

The at least one hydraulic pressure may be translated to a relative hydraulic pressure based on the obtained signal related to the hydraulic pressure and based on a maximum system pressure. The maximum pressure is characteristically a maximum system pressure of a hydraulic cylinder of the hydraulic circuit in which the hydraulic pressure is obtained by means of the pressure sensor. The implement has information related to the maximum pressure(s). The maximum hydraulic pressure(s) are characteristically known for example by measurements. An example of this is discussed below.

The load weight determining element may be arranged to determine the load weight related to a load carried by a working tool attached to the implement. The load weight determining element is arranged to determine the load weight based on the obtained hydraulic pressure.

The load weight determining element 793 is arranged to calculate the load weight based on a known relation between the load weight and the hydraulic pressure and based on the signal obtained by the pressure sensor. The obtained hydraulic pressure may relate to a hydraulic pressure in the lifting hydraulic circuit(s) and or lifting hydraulic cylinder(s). The known relationship is measured or calculated, or a combination thereof. The known relation may be determined based on geometrical calculations and/or a calibration process. A calibration process will be described more in detail below.

The load determining element 793 is control element may be arranged to record an obtained hydraulic pressure related to a lifting cylinder of the lifting cylinder arrangement during lift of the arm. The load determining element is then arranged to determine the load weight based on the recorded pressure. As stated above, the load weight determining element 793 is arranged to calculate the load weight based on a known relation between the load weight and a curve representing the hydraulic pressures obtained by the pressure sensor during the lift.

The load determining element 793 is in one example arranged to receive hydraulic pressure signals from both sides of a lifting cylinder of the lifting cylinder arrangement and to determine the load weight based on a pressure difference between the respective sides of the lifting cylinder. For example local control element is arranged to receive the hydraulic pressure signals from both sides of a lifting cylinder of the lifting cylinder arrangement. The load determining element may be arranged to receive the hydraulic pressure signals from pressure sensors mounted at a respective hydraulic line connected to the lifting cylinder arrangement. The difference pressures define the forces exerted by the hydraulic cylinder arrangement. The effects of any back pressures or counter pressures are then accounted for. Thereby the accuracy of the determination can be increased.

The load weight determining element 793 may be arranged to receive at least one sensor signal relating to the rotational position of the implement in relation to the work vehicle. Different ways of obtaining sensor signal relating to the rotational position of the implement in relation to the work vehicle are for example disclosed herein.

The load weight determining element is arranged to record the obtained hydraulic pressure during lifting when the signals relating to the rotational position of the implement in relation to the work vehicle indicates that the arm is within predetermined boundaries for load weight determination.

Thereby it can be secured that hydraulic pressures are recorded within boundaries where the dynamics of the system are stable. In practice this means that the hydraulic pressures are not recorded close to the end points for the movement of the arm. Thereby the accuracy of the determination can be increased.

The load weight determining element 793 may be arranged to obtain a failure status report and/or refrain from determining a load weight when records of the hydraulic pressures have not been obtained for the entire range delimited by the boundaries for load weight determination.

Thereby it can be secured that the records of the hydraulic pressures have been obtained for the entire range. Accordingly, the accuracy of the load weight determination can be secured with this respect. In the example wherein the load weight determining element refrains from delivering a result when records have not been obtained for the entire range, and an accurate load weight determination may not be achieved, it can be ensured that no faulty weight results are delivered. Further, in the example wherein a failure status report is obtained, this report can comprise information related to the cause of the failure. Thus, the failure status report forms a guide for the operator to improve the behaviour in order to be able to achieve accurate load weight determinations.

Further, the load weight determining element 793 may be arranged to determine a speed of the lifting movement during lift of the load. The load weight determining element 793 is arranged to obtain a failure status report and/or refrain from determining a load weight when the lifting speed is outside predetermined limit(s).

Thereby it can be secured that the arm has been moved with a speed suitable for an accurate determination of the load weight. Accordingly, the accuracy of the load weight determination can be secured with this respect. In the example wherein the load weight determining element refrains from delivering a result when the speed of the movement is outside set boundaries, and an accurate load weight determination may not be achieved, it can be ensured that no faulty weight results are delivered. Further, in the example wherein a failure status report is obtained, this report can comprise information related to the cause of the failure. Thus, the failure status report forms a guide for the operator to improve the behaviour in order to be able to achieve accurate load weight determinations.

The load weight determining element may be arranged to receive sensor signals at least related to the rotational position, or tilt angle, of the working tool in relation to the implement. Different ways of obtaining sensor signal relating to the rotational position of the working tool in relation to the implement are disclosed herein.

The load weight determining element is then arranged to determine the rotational position of the tool during the lifting. The load weight determining element 793 may then be arranged to obtain a failure status report and/or refrain from determining a load weight when the rotational position of the tool during lifting is outside predetermined limit(s).

Thereby it can be secured that the working tool has a suitable rotational position for accurate determination of the load weight. Accordingly, the accuracy of the load weight determination can be secured in this respect. In the example wherein the load weight determining element refrains from delivering a result when rotational position is outside set boundaries, and an accurate load weight determination may not be achieved, it can be ensured that no faulty weight results are delivered. Further, in the example wherein a failure status report is obtained, this report can comprise information related to the cause of the failure. Thus, the failure status report forms a guide for the operator to improve the behaviour in order to be able to achieve accurate load weight determinations.

Thus, load weight determining element may be arranged to determine whether the calculated load weight fulfils pre-set requirement(s) and when the pre-set requirement(s) are not fulfilled, obtain a failure status report informing that the calculation of the load weight does not fulfil pre-set requirements to the digital interface. The failure status report may comprise information related to which pre-set requirement is not fulfilled. The load weight determining element may be arranged to refrain from feeding the calculated load weight to the digital interface when the pre-set requirements are not fulfilled. Thereby, the operator can be confident that the load weight results delivered are reliable. It can even be determined an uncertainty related to the delivered load weight result based on the signals used for the calculations in relation to the pre-set requirements for the signals. Thus, it can even be established that the actual weight are within pre-set boundaries.

Further, as communication of data to and from the implement is performed digitally via the digital interface 701, this provides for a robust solution where no analogue signals have to be communicated between the implement and the work vehicle to which it is attached.

In the illustrated example, the local control element comprises further a calibration element 792. The calibration element is arranged to record an obtained first reference hydraulic pressure related to the lifting cylinder arrangement during lift with a first predetermined load and to save the first pressure curve related to said lift with a first predetermined load. The calibration element 792 is further arranged to record an obtained second reference pressure related to the lifting cylinder arrangement during lift with a second predetermined load and to save the second reference pressure curve related to said lift with the second predetermined load.

The load weight determining element 793 is then arranged to determine the load weight based on the saved first reference pressure curve related to the lift with the first predetermined load and the saved second reference pressure curve related to the lift with the second predetermined load.

The calibration element may be arranged to obtain a rotational position of the tool at the recorded pressure curve related to the lifting with the first predetermined load and/or the lifting with the second predetermined load.

These obtained rotational positions associated to the first and second reference pressures, respectively, can be used by the load weight determining element 793 to secure that the rotational position of the tool during lifting of a weight are within the predetermined limit(s).

Thus, if lifting is performed with a rotational position deviating more than a pre-set value from the rotational positions used when obtaining the first and/or reference curves, the control load weight determining element 793 can, as discussed above, be arranged to obtain failure status report and/or refrain from determining a load weight.

In different examples additional reference curves can be obtained. For example, reference curves for two or more different rotational positions of the working tool can be obtained. Then, when performing lift form load weight determination the operator can choose to do the lift at one of the those rotational positions of the working tool. The load weight determining element can then, based on the rotational position of the working tool during the lift, select to perform load weight calculation based on the reference curves which are associated to that rotational position of the working tool. Alternatively, the load weight determining element may be arranged to determine the load weight at any rotational position of the working tool based on reference curves at a plurality of rotational position. The load weight determining element may then be arranged to base the load weight determination based on interpolation or extrapolation of the reference curves.

Further, load weight determination can instead be made in the same manner while lowering the implement. The reference curves are then characteristically recorded when lowering the implement.

In different embodiments the control element is arranged to feed information to the digital interface related to the rotational position of the tool at the recorded first reference pressure curve related to the lift with the first predetermined load and/or the rotational position of the tool at the recorded second reference pressure curve related to the lift with the second predetermined load.

In this way the operator of the work vehicle can view the rotational positions used when making the calibrations and to adapt the behaviour accordingly to as much as possible imitate the situation when the calibration curves were taken.

More details of the calibration element 792 as disclosed in the examples described in relation to FIGS. 6 and 12.

The local control element 708 may be arranged to receive an operator control signal comprising a request for a load weight. The load weight determining element 793 may then be is arranged to obtain said load weight related information and feed it to the digital interface based on said load weight request. In one example the request is a continuous request, wherein the load weight related to repeated measurements is continuously fed to the digital interface as long as the request is maintained. I.e., obtaining of information related to the implement is performed in a load weight determining mode of operation.

The task planning element may further be arranged to request valve control in accordance with the operator input.

The local control element 708 may further comprise a valve control element 794. The valve control element 794 of the local control element 308 is arranged to receive an operator control signal via the digital interface 701 for operator control of at least one first hydraulic function. The valve control element 794 is arranged to determine a control signal adapted to control at least one control valve based on said operator control signal, and to transmit said control signal to the at least one control valve. Below examples of designs of the valve control element are described in relation to FIG. 11.

In the illustrated example, the local control element 708 comprises further a task planning element 1295. The task planning element 1295 may be arranged to receive the operator control signal comprising said request for a load weight. The task planning element 1295 is then arranged to control the load weight determining element to obtain said load weight related information and feed it to the digital interface based on said load weight request.

The task planning element 1295 is arranged to manage the requests from an operator interface in the form of an operator control signal received via the digital interface. The task planning element 1295 is arranged to control output to the digital interface and further to a display of the operator interface in response to the received requests.

The task planning element 1295 is arranged to feed the request to the dedicated calculating elements, such as the load weight determining element 793, the calibration element 792 or the task planning element 1295. The task planning element 1295 may be arranged to continuously request updated calculations from the calculating elements. The updating frequency may be set based on the requirements and/or dynamics of the specific task. The updating frequency may further be set based on available processor capacity and/or bandwidth for transmission.

Figure 5:
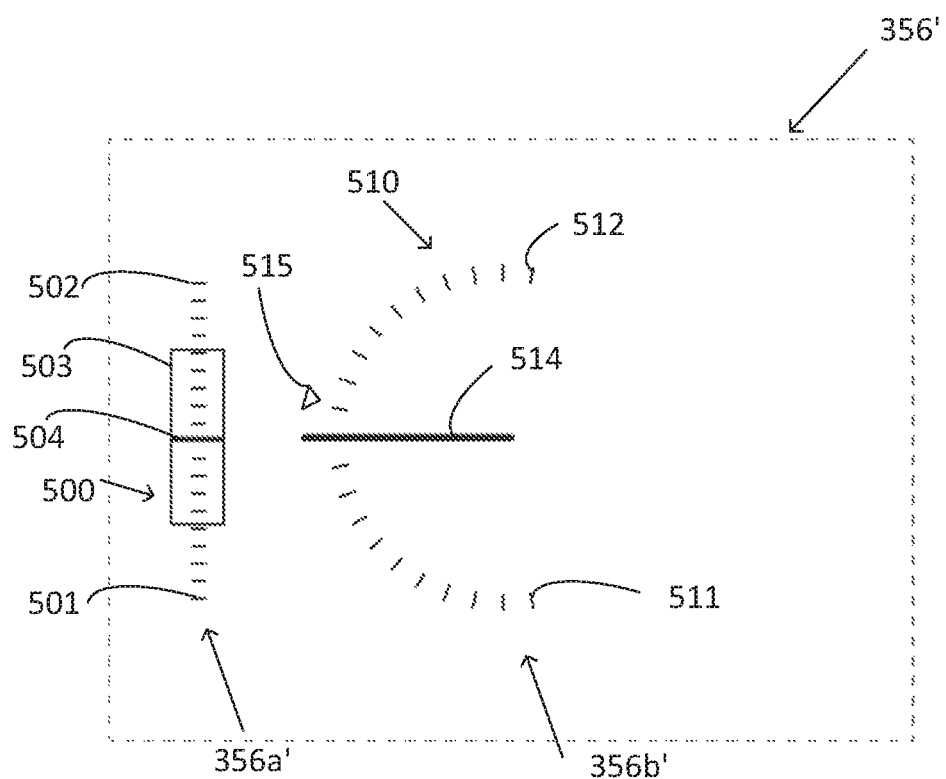
FIG. 5 illustrates first examples of a display presentation.

FIG. 5 illustrate schematically examples of display presentations of state parameters transmitted from a local control element arranged at an implement, to said display. The state parameters are characteristically transmitted via the digital interface and presented at the display. Different examples of displays include displays with a touch screen or displays with or connected to a key board. The display may be a mobile device with a display such as a PDA (Personal Digital Assistant).

FIG. 5 discloses an example of a display presentation 356' presented while performing weight determination. Load weight determination is in the illustrated example performed based on an obtained hydraulic pressure related to the lifting cylinders during lift of the load, wherein the local control element is arranged to determine the load weight based on the registered pressure, based on obtained signals relating to the rotational position of the implement in relation to the work vehicle and based on obtained signals relating to the rotational position of the tool in relation to the implement.

In the illustrated example, a left display presentation part 356a' presents continuously during lift a position of the implement in relation to the work vehicle. In other words, this left display presentation part 356a' presents continuously a lifting height of the implement.

In the illustrated example, the present lift height is presented as a mark 504 on column 500. Any other type of diagram one dimensional diagram can be used for marking the height of the implement. In this particular example, a bottom 501 of the column 500 represents that the implement is positioned at its minimum position which is characteristically the ground position. A top 502 on the column represents that the implement is raised to its maximum lift position. The minimum lift position is in this disclosure defined as a zero point for the lift of the implement in relation to the implement. Thus, the bottom 501 represents no lift and the top 502 represents 100% lift.

In the illustrated example, a mark 503 indicates an interval along the extension of the column. This interval mark 503 indicates a lift range in which load weight determination is performed.

Further, in the illustrated example, left display presentation part 356b' presents a first state a rotational or tilt position of the working tool in relation to the implement. In the illustrated example, the tilt position is marked by way of a mark 514 on a diagram 510. The diagram 510 has the shape of a periphery of a circle sector. Any other type of one dimensional diagram can be used for marking the rotational position of the working tool in relation to the implement. Further, at least one reference rotational position is indicated in left display presentation as a reference mark 515. The reference mark 515 indicates the rotational positions or angle(s) used when recording reference hydraulic curves.

The angular extension of the circle sector may coincide with the tilt range of the working tool. In the illustrated diagram, the available tilt range extends between an upper 512 endpoint and a lower 511 endpoint for rotation of the working tool. The upper 512 endpoint represents a maximum rotational position and the lower endpoint 511 represents minimum rotational position. The minimum rotational position is in this disclosure defined as a zero point for the rotational position of the work tool in relation to the implement.

The mark 514 is in the illustrated example formed as a pointer from a center of the circle sector extending to the periphery.

The operator can with this presentation follow relevant parameters when performing lift for weight determination. As discussed in relation to FIG. 7, the display presentation can after a lift for weighting a load obtain a feed-back related to whether load weight has been accurately determined. If load weight has not been accurately determined, the display presentation may display a failure status report informing of the cause for not obtaining an accurate load weight determination.

Figure 6A:
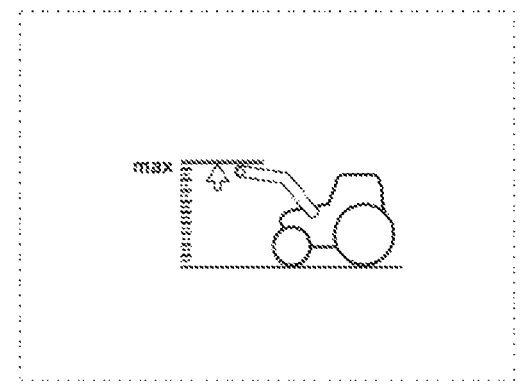
FIGS. 6a-6c illustrate second examples of display presentations.
Figure 6B:
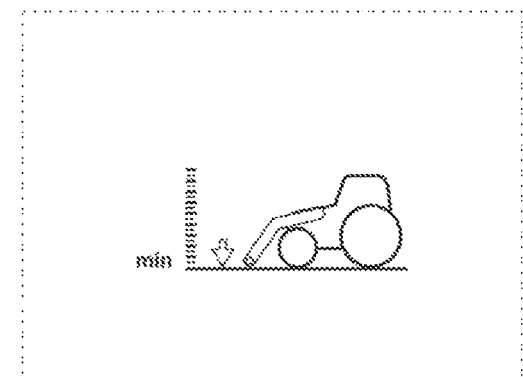
Figure 6C:
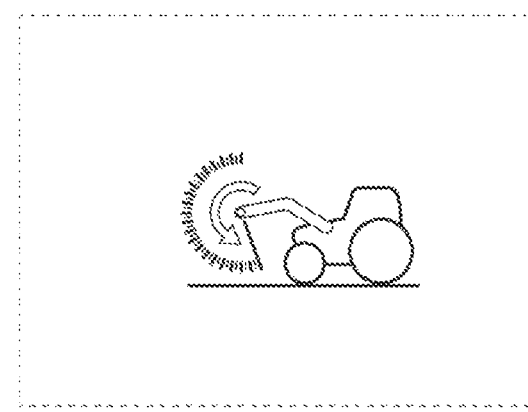

FIGS. 6a-6c illustrate schematically operation of a calibration element of a local control element for supporting in calibration after mounting of a new implement. The calibration element comprises a guided instruction for recording settings for the new implement for use in later calculations by the local control element.

FIG. 6a illustrates a first step of the guided instruction. This first step comprises presentation of lift of the implement to its highest, maximum position. When the highest, maximum position has been reached, the settings of position sensors related to the implement at the upper maximum position are recorded. The recording is performed either automatically or upon operator request to record the highest, maximum position. This set maximum position can be used in any application for determining the height of the implement. This set maximum position may in particular be used for determining the height of the implement for example during lift for load weight determination.

The guided instruction then moves to a second step.

FIG. 6b illustrates a second step of the guided instruction. This second step comprises presentation of lowering the implement to its lowest position. When the lowest, minimum position has been reached, the settings of position sensors related to the implement at this lowest, minimum position are recorded. The recording is performed either automatically or upon operator request to record the lowest, minimum position. This set minimum position may be used in any application for determining the height of the implement. This set minimum position may in particular be used in determining the height of the implement for example during lift for load weight determination.

The recoded maximum and minimum positions are stored as characteristics of the implement. The values can be used in operating any working tool by means of the implement. The values for the maximum and minimum positions define the range of operation of the implement. Any obtained implement lift related sensor signals can then be correlated to these minimum and maximum positions to provide lift height information.

However, in this step, a system maximum pressure related to lift cylinder(s) of the implement is also determined. Accordingly, the operator is required to continue press the implement to the lowest position until the maximum system pressure has been reached. Then the maximum, system pressure is recorded. The recording is performed either automatically of upon operator request to record the maximum pressure.

The recorded maximum hydraulic pressure is stored as a characteristic of the implement. The value can be used in operating any working tool by means of the implement. The values maximum hydraulic pressure defines the range of operation of the implement. Any obtained hydraulic pressure related sensor signals can then be correlated to this maximum hydraulic pressure to provide lift height information.

The steps can be performed in opposite order, wherein the steps illustrated in FIG. 6b is first performed and then the step illustrated in FIG. 6a is performed.

FIG. 6c illustrates yet a step of the guided instruction. This step relates to recording maximum and minimum rotational positions for the working tool in relation to the implement. In the Figure it is illustrated that the operator is requested to operate the working tool to its maximum rotational position. When the maximum rotational position of the working tool has been reached, the settings of position sensors related to the working tool at the maximum rotational position are recorded. The recording is performed either automatically or upon operator request to record the maximum rotational position. This set maximum rotational position can be used in any application for determining the rotational position of the working tool. This set maximum position may in particular be used for determining the rotational position of the working tool for example during lift for load weight determination.

The recording of the minimum rotational positions of the working tool in relation to the implement comprises the following. The operator is requested to operate the working tool to its minimum rotational position. When the minimum rotational position of the working tool has been reached, the settings of position sensors related to the working tool at the minimum rotational position are recorded. The recording is performed either automatically or upon operator request to record the minimum rotational position. This set minimum rotational position can be used in any application for determining the rotational position of the working tool. This set maximum position may in particular be used for determining the rotational position of the working tool for example during lift for load weight determination.

The recoded maximum and minimum rotational positions are stored as characteristics of the implement. The values can be used in operating any working tool by means of the implement. The values for the maximum and minimum rotational positions define the range of operation of the implement. Any obtained rotational position related sensor signals can then be correlated to these minimum and maximum rotational positions to provide rotational position or angle information.

These steps may be performed in opposite order.

FIGS. 12a-12e illustrates schematically operation of the calibration element for assisting in determining settings of the implement along with working tool for accurate load weight determination. The calibration element comprises a guided instruction for recording settings for the implement together with the working tool for use in later calculations by the load weight determining element.

Figure 12A:
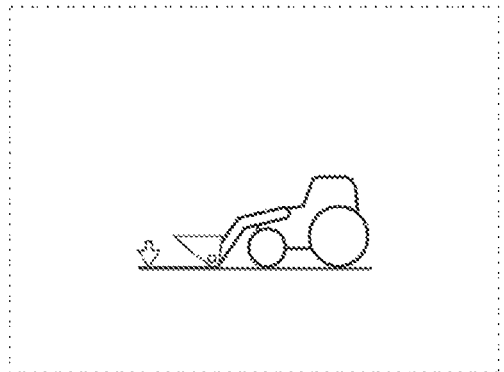
FIGS. 12a-12e disclose third examples of display presentations.

FIG. 12a illustrates a first step of the guided instruction for determining settings for accurate load weight determination. This first step comprises presentation of lowering of the implement to its lowest position at the ground. When the implement is at its lowest position, at the ground, the guided instruction proceeds to a second step. The second step is either entered automatically or upon operator request.

Figure 12B:
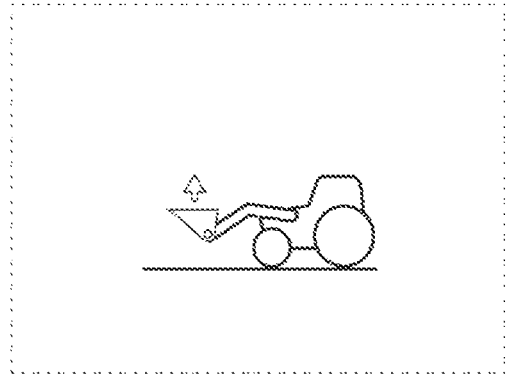

FIG. 12b illustrates the second step of the guided instruction for determining settings for accurate load weight determination. This second step comprises presentation of lifting of the implement towards it highest, maximum position. When the implement has started to lift, the guided instruction proceeds to a third step.

Figure 12C:
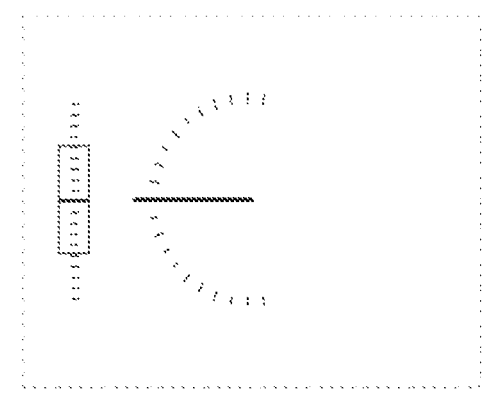

FIG. 12c illustrates the third step of the guided instruction. In the third step, the height of the implement is continuously illustrated in the column of the left diagram. An interval in the middle of the column indicates that measuring for weight determination is performed within this interval. Factors which may be important for accurate load weight determination are lifting speed at least within the measuring interval and/or rotational position of the working tool. In FIG. 12c, lift height is continuously presented during the lift movement. Further, present rotational position is also presented during the lifting movement, as presented in the diagram to the right. In a not illustrated example, a recommended rotational position is presented in the right diagram during the lifting movement.

A first reference pressure curve with pressures given as a function of height of the implement, or the like, is recorded. The rotational position of the working tool in the load weight measuring interval may also be recorded. Further a velocity or speed of the implement while measuring may also be recorded. In one example, the velocity or speed of the implement and/or rotational position of the working tool when measuring is evaluated. If for example the speed of the implement is above a predetermined value, the guidance instruction does not record the measurement. Instead, the operator may be requested to make a new lifting movement from the minimum position. The request may be made together with information related to the cause of the failure. Further, if the rotational position of the work vehicle is outside present limit(s) the calibration element can be arranged not to record the measurement. As in the previous example, the guiding instruction may be arranged to request the operator to make a new lifting movement from the minimum position. The request may be made together with information related to the cause of the failure.

The lifting movement of FIG. 12c can be made with empty load. Then this first reference curve relates to the load weight of the working tool. Then this weight can be easily eliminated in load weight calculations. If the working tool carries a load, the weight of the load should be input in conjunction with this phase. The load weight may be input by means of the operator interface.

Figure 12D:
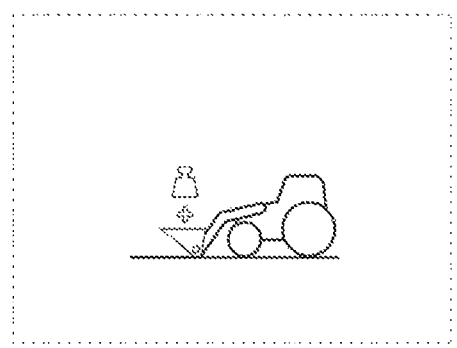
Figure 12E:
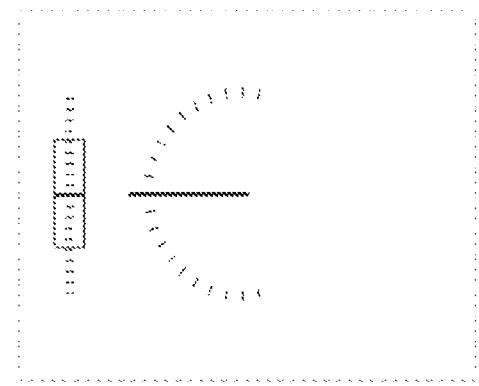

FIG. 12d illustrates the fourth step of the guided instruction for determining settings for accurate load weight determination. This fourth step comprises presentation of lifting of the implement towards it highest, maximum position with a known load. Thus, the operator is requested to redo the lift, with the known load. The weight of the load should be input in conjunction with this phase. The load weight may be input by means of the operator interface. It is important that the first lift of FIGS. 12b and 12c and the second lift of FIGS. 12d and 12e are made with different loads. When the implement has started to lift, the guided instruction proceeds to a fifth step.

FIG. 12d illustrates the fifth step of the guided instruction. This coincides with the third step but performed with a different reference load so as to obtain a second reference curve.

After this sequence of steps has been performed, the implement is ready for load weight determination.

Generally, the local control element of the implement can be arranged to store thereon a calibration set related to each tool which has been calibrated with the implement. The operator can then select from the operator interface which working tool is mounted to the implement and accordingly, the calibration settings associated to that working tool are applied. Alternatively, the implement is arranged to identify which working tool is mounted to the implement based on sensor signal input. Then, the calibration set associated to that working tool can automatically be applied.

Further, each working tool may be associated with a plurality of calibration sets. Each calibration set may be intended for a given orientation of the working tool. The local control element can then be arranged to determine which calibration set is to be applied based on sensor input. Alternatively, the operator of the work vehicle can select which calibration set for the working tool is to be applied.

Alternatively or in addition thereto, if the working tool is provided with a working tool local control element, the working tool local control element can be arranged to store thereon the calibration set(s) associated with that working tool. Alternatively or in addition thereto, the working tool local control element is arranged to determines which tool is attached to the implement and/or determine the orientation of the attached working tool. The working tool local control element may then be arranged to transmit this information to the implement local control element for determination of which calibration set is to be applied.

Figure 8:
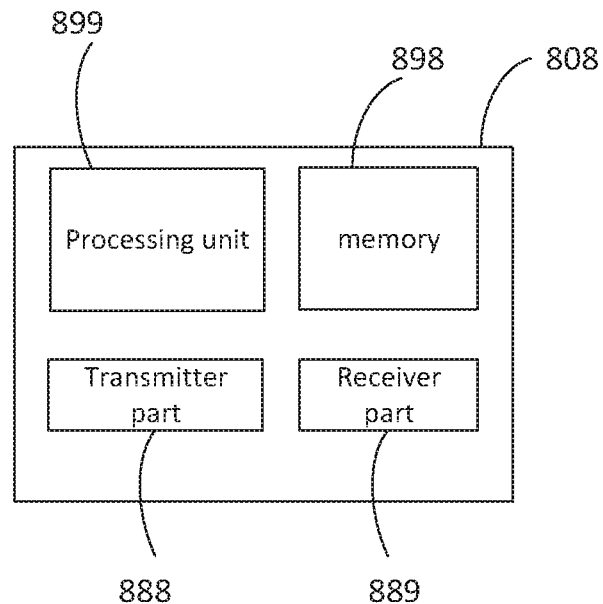
FIG. 8 is a block scheme schematically illustrating an example of a local control element.

FIG. 8 illustrates a local control element 808. The local control element 808 comprises a receiver part 889, a transmitter part 888, a processing unit 899 and memory 898 or memories. Program code for executing the different tasks of the local control element is stored in the memory 898 or memories. Further, the memory can store data related to the implement. Sensor data obtained from the at least one sensor and possible control data from the operator input element can be stored in the memory. Further, processed information related to the obtained sensor data may also be stored on the memory. Thus, intelligence is related to implement, the local control element is not only a gatherer of data.

Accordingly, all data related to the implement is obtained, processed and stored within the implement. Thus, as all data related to the implement is stored in the memory of the implement. This has the consequence that if an implement is moved for example to another work vehicle, all data associated therewith follows the implement. Accurate monitoring of the operation of the implement is enabled. Operational data is obtained by and related to the implement. Switching the implement between work vehicles can be made without disturbing monitoring. Monitoring can be made when the implement is attached to any work vehicle. Communication with the implement can be performed digitally. No analogue signals for example related to sensor data is for example communicated to the work vehicle. For example, the local control element can form a CAN node in a CAN network of the work vehicle. When the local control element is used for control of hydraulics at the work vehicle for control of the implement, the work vehicle does not need to comprise components secured for control of the implement. All such components are present within the implement. Thus, the work vehicle can be produced at a lower cost.

As is clear from the above, the transmitter part 888 and the receiver part 889 of the local control element can be arranged for digital transmission/reception, either wired or wirelessly. For example, the local control element transmitter and received can form a CAN transmitter/receiver connected to CAN of the work vehicle.

The local control element can instead, or in addition thereto, be remotely accessed. The local control element then has or is connected to a wireless communication element. The wireless communication element may be arranged to communicate by means of Bluetooth and/or Wi-Fi and/or radio. The local control element is arranged to feed obtained sensor signals/and or at least one state parameter and/or signals or messages recovered or otherwise obtained from the work vehicle. The wireless communication element may be arranged to feed data to a data storage and processing system. The wireless communication element may be arranged to feed data to a mobile application having access to the data storage and processing system.

Thus, the data stored by the implement can instead or in addition thereto be communicated to a remote location. The data can be transmitted to a remote data storage system. The remote data storage and processing system may be arranged to store data related to a plurality of implements. The remote data storage system may comprise one or a plurality of databases. Further, the data can be communicated to a mobile application. The data may be communicated to the remote data storage system via the mobile application. In one example, the implement communicates with the mobile application over Bluetooth. The mobile application or the remote storage system may provide information to different applications such as a web application, for example of the implement owner or implement user or a customer support or an administration centre.

When the working tool has a local working tool control element, for example as discussed in relation to FIG. 4, the local working tool control element can be designed in the same manner.

Figure 11:
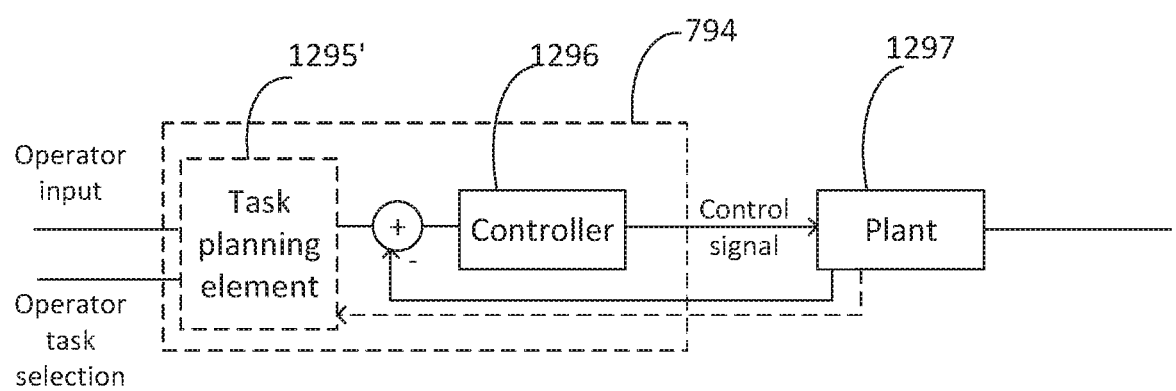
FIG. 11 is a scheme schematically illustrating the operation of a valve control element of a local control element.

In FIG. 11, an example of a valve control element of a local control element is disclosed. The valve control element receives an operator input signal received from an operator control element. The operator control signal may be a signal from a joystick or from a display with input means or from physical input buttons.

In different examples, wherein the control valve is substantially directly controlled by the joystick or input means of the display, movement of for example the joystick along one line (such as left/right) may indicate selection of a hydraulic function associated to that movement while movement of for example the joystick along a different line (such as up/down), may indicate selection of another function associated to that movement. Further when controlling the hydraulic function controlled by the selected movement, movement of the joystick in one direction (such as left) would form a selection of hydraulic flow in one direction and movement of the joystick in the other (such as right) would form a selection of hydraulic flow in the other direction. Further, the position of the joystick in relation to a zero position may form a selection of the size of the hydraulic flow.

Different tasks of the implement may be pre-programmed to a task planner element 1295'. One example of a task planning element is described in relation to FIG. 7. Tasks are selected by means of an operator task selector signal. Characteristically the operator task selection signal is obtained via the input means of the display. However, different tasks can also be selected using the joystick or physical buttons in a console. The task planner is arranged to form a processed output based on the operator input signal and the operator task selection signal.

The operator input signal and/or an output from the task planning element 1295' forms as a set value to a closed loop. The closed loop comprises a controller 1296. The controller may be any type of regulator such as a P regulator, PI-regulator or a PID regulator. The signal output by the controller forms the control signal for the control valve(s) of the work vehicle. Further, a signal representing an actual value is fed back. Further available states of the plant 1297, i.e. control valves, implement and possibly work vehicle, are fed to the task planner for processing. The states may include obtained sensor signals. The states may include other type of information such as information related to the states of valves, the work vehicle etc.

Accordingly, the valve control element continuously obtains control signals for the control of the work vehicle control valves.

The task planning element 1295' may partly or as a whole form part of the task planning element as disclosed in relation to FIG. 7.

Figure 9:
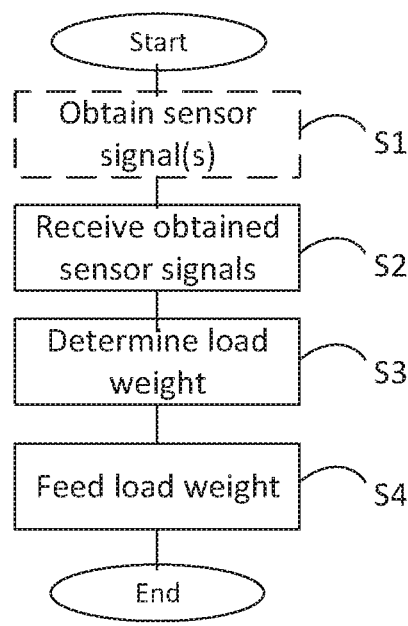
FIG. 9 is a flow chart illustrating an example of a method for obtaining information related to an implement.

In FIG. 9, a method for obtaining information related to an implement is illustrated. The method is performed at said implement connectable to a work vehicle. The implement comprises at least one second sensor, a digital interface for communication with the work vehicle and a local control element connected to said digital interface. The method comprises the steps of: receiving S2 at the local control element obtained sensor signals, determining S3 at the control element the information related to the obtained sensor signals and feeding S4 the information related to the obtained sensor signals to the digital interface. The step of determining S3 the information related to the obtained sensor signals comprises determining a load weight.

The method may further comprise a step of obtaining S1 sensor signals related to the implement by means of the at least one sensor.

The examples as disclosed herein present examples of load weight calculations using exemplified sensor types. However any type of sensors can be used. For example the sensors may be mounted to the implement and/or working tool attached thereto including but not limited to at least one accelerometer and/or at least one GPS receiver or the like and/or at least one volt meter and/or at least one strain gauge or other force sensing sensor.

We claim:

1. An implement connectable to a work vehicle, said implement comprising:
   an arm;
   a fastening arrangement arranged at a first part of the arm, said fastening arrangement being connectable to the work vehicle;
   an attaching arrangement arranged at second part of the arm, said attaching arrangement being attachable to a tool;
   a first implement hydraulic connection connectable to the work vehicle by means of a corresponding first vehicle hydraulic connection;
   a first hydraulic circuit configured to carry hydraulic fluid to at least one first-hydraulic function and a second hydraulic circuit configured to carry hydraulic fluid to at least one second hydraulic function, wherein the at least one second hydraulic function comprises a lifting function;
   at least one first sensor and at least one second sensor, the second sensor arranged to obtain sensor signals at least related to the lifting function;
   a local control element; and
   a digital interface to the work vehicle,
   wherein the local control element is arranged to receive the obtained sensor signals at least related to the lifting function, to process the received sensor signals so as to determine a load weight and to feed the determined load weight to the digital interface,
      wherein the digital interface is arranged to transfer the load weight to the work vehicle,
   wherein the digital interface is arranged to transmit the received sensor signals to the work vehicle,
   wherein, when the first implement hydraulic connection is connected to the corresponding first vehicle hydraulic connection, the first hydraulic circuit is controlled by means of a work vehicle mounted control valve and is configured to carry hydraulic fluid to the at least one first hydraulic function, and
   wherein the digital interface comprises a digital interface part connectable to the work vehicle, the digital interface part is connectable to the work vehicle by means of a corresponding vehicle digital interface part connectable to the local control element, such that, when the digital interface parts are connected, digital communication between the work vehicle and the local control element of the implement is provided.

2. The implement according to claim 1, further comprising a first lifting hydraulic cylinder arrangement for control of the lifting function.

3. The implement according to claim 2, wherein the at least one second sensor comprises a pressure sensor arranged to obtain a signal related to at least one hydraulic pressure related to the first lifting hydraulic cylinder arrangement, and wherein the local control element is arranged to determine the load weight based on the obtained hydraulic pressure.

4. The implement according to claim 2, wherein the at least one pressure sensor comprises sensors obtaining pressure signals at both sides of a lifting cylinder of the first lifting hydraulic cylinder arrangement, and wherein the local control element is arranged to determine the load weight based on a pressure difference between the respective sides of the lifting cylinder.

5. The implement according to claim 4, wherein the pressure sensors are mounted at a respective hydraulic line connected to the first lifting hydraulic cylinder arrangement.

6. The implement according to claim 2, wherein the local control element is arranged to record an obtained hydraulic pressure related to a lifting cylinder of the first lifting hydraulic cylinder arrangement during lift of the arm, and wherein the local control element is arranged to determine the load weight based on the recorded pressure.

7. The implement according to claim 6, wherein the at least one first sensor comprises a first position sensor and the at least one second sensor comprises a second position sensor, the second position sensor arranged to obtain signals relating to the rotational position of the implement in relation to the work vehicle, and wherein the local control element is arranged to record the obtained hydraulic pressure during lifting when the signals relating to the rotational position of the implement in relation to the work vehicle indicates that the arm is within predetermined boundaries for load weight determination.

8. The implement according to claim 7, wherein the local control element is arranged to obtain a failure status report and/or refrain from determining the load weight when records of the hydraulic pressures have not been obtained for the entire range delimited by the boundaries for load weight determination.

9. The implement according to claim 8, wherein the local control element is arranged to determine a speed of the lifting movement during lift of the load, and to obtain failure status report and/or refrain from determining the load weight when the lifting speed is one or more outside predetermined limits.

10. The implement according to claim 1, further comprising at least one second hydraulic function comprising a movement of the working tool in relation to the implement; and at least one first sensor arranged to obtain sensor signals at least related to the movement of the working tool in relation to the implement, wherein the local control element is arranged to determine a rotational position of the tool during the lifting.

11. The implement according to claim 10, wherein the local control element is arranged to obtain failure status report and/or refrain from determining the load weight when the rotational position of the tool during lifting is one or more outside predetermined limits.

12. The implement according to claim 1, wherein the local control element is arranged to obtain calibration information, wherein the local control element is arranged to record an obtained hydraulic pressure related to the first lifting hydraulic cylinder arrangement during lift with a first predetermined load, save a pressure curve related to said lift with a first predetermined load, record an obtained pressure related to the first lifting hydraulic cylinder arrangement during lift with a second predetermined load, and save the pressure curve related to said lift with the second predetermined load, and wherein the local control element is arranged to determine the load weight based on a saved pressure curve related to the lift with the first predetermined load and a saved pressure curve related to the lift with the second predetermined load.

13. The implement according to claim 12, wherein the local control element is arranged to obtain a rotational position of the tool at recorded pressure curve related to the lifting with the first predetermined load and the lifting with the second predetermined load.

14. The implement according to claim 13, wherein the local control element is arranged to feed information to the digital interface related to the rotational position of the tool at the recorded pressure curve related to the lift with the first predetermined load and the lift with the second predetermined load.

15. A work vehicle arrangement comprising a work vehicle, and an implement according to claim 1 attached to said work vehicle.

16. The work vehicle arrangement according to claim 15, wherein the work vehicle comprises means for attachment such that the implement is rotatable in relation to the work vehicle in at least one direction.

17. The work vehicle arrangement according to claim 15, wherein the work vehicle comprises at least one control valve controlled at least partly by the implement.

18. The work vehicle arrangement according to claim 15, further comprising an operator interface connected to the digital interface.

19. The work vehicle arrangement according to claim 18, wherein said operator interface comprises a display arranged to display the load weight.

20. The work vehicle arrangement according to claim 18, wherein an operator control interface comprises a presentation element comprising a processor arranged to process the load weight and a display arranged to present the load weight.

21. The work vehicle arrangement according to claim 18, wherein the operator interface comprises a user input element.

22. A method for obtaining information related to an implement, said method being performed at said implement connectable to a work vehicle, said method comprising the steps of:
connecting the implement to a first part of an arm via a fastening arrangement;
connecting an attaching arrangement to a second part of the arm, said attachment arrangement being connectable to a tool;
connecting the implement to the work vehicle by connecting an implement hydraulic connection to a vehicle hydraulic connection;
carrying a first hydraulic fluid, via a first hydraulic circuit, to at least one first hydraulic function and a second hydraulic fluid, via a second hydraulic circuit, to at least one second hydraulic function, wherein at least one of the first hydraulic function or the second hydraulic function includes a lifting function;
receiving obtained sensor signals related to the lifting function of the implement from at least one first sensor at a local control element;
processing obtained sensor signals using the local control element;
feeding information related to the obtained sensor signals to a digital interface; and
transmitting the obtained sensor signals from the digital interface to the work vehicle;
wherein the step of determining the information related to the obtained sensor signals comprises determining a load weight;
wherein the first hydraulic circuit is controlled by means of a work vehicle mounted control valve configured to carry a hydraulic fluid to at least one hydraulic function; and
wherein the digital interface comprises a digital interface part connectable to the work vehicle, the digital interface part is connectable to the work vehicle by means of a corresponding vehicle digital interface part connectable to the local control element, such that, when the digital interface parts are connected, digital communication between the work vehicle and the local control element of the implement is provided.

23. The method according to claim 22, further comprising a step of obtaining sensor signals related to the implement by means of the at least one sensor.

* * * * *